US011053956B2

United States Patent
Nishijima et al.

(10) Patent No.: US 11,053,956 B2
(45) Date of Patent: Jul. 6, 2021

(54) EJECTOR

(71) Applicant: DENSO CORPORATION, Kariya (JP)

(72) Inventors: Haruyuki Nishijima, Kariya (JP); Yoshiaki Takano, Kariya (JP); Yoshiyuki Yokoyama, Kariya (JP); Hiroshi Oshitani, Kariya (JP); Yohei Nagano, Kariya (JP); Ryota Nakashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 16/073,824

(22) PCT Filed: Jan. 24, 2017

(86) PCT No.: PCT/JP2017/002204
§ 371 (c)(1),
(2) Date: Jul. 30, 2018

(87) PCT Pub. No.: WO2017/135093
PCT Pub. Date: Aug. 10, 2017

(65) Prior Publication Data
US 2019/0032677 A1 Jan. 31, 2019

(30) Foreign Application Priority Data

Feb. 2, 2016 (JP) .............................. JP2016-018067
Dec. 22, 2016 (JP) .............................. JP2016-248885

(51) Int. Cl.
*F04F 5/16* (2006.01)
*F04F 5/48* (2006.01)
(Continued)

(52) U.S. Cl.
CPC ................ *F04F 5/20* (2013.01); *F04F 5/461* (2013.01); *F04F 5/48* (2013.01); *B60H 2001/3298* (2013.01)

(58) Field of Classification Search
CPC combination set(s) only.
See application file for complete search history.

(56) References Cited

U.S. PATENT DOCUMENTS

2007/0028630 A1 * 2/2007 Yamada .................. F25B 41/00
                                                              62/170
2009/0232665 A1    9/2009 Gocho et al.
(Continued)

FOREIGN PATENT DOCUMENTS

JP      S43002670 B1   1/1968
JP      2013177879 A * 9/2013 ................ F04F 5/50
(Continued)

*Primary Examiner* — Devon C Kramer
*Assistant Examiner* — David N Brandt
(74) *Attorney, Agent, or Firm* — Harness, Dickey & Pierce, P.L.C.

(57) ABSTRACT

An ejector includes a body including an inflow space into which a refrigerant flows, a passage formation member disposed inside the body and having a conical shape, and a nozzle passage having an annular cross section which functions as a nozzle and a diffuser passage having an annular cross section which functions as a pressure increase portion, the nozzle passage and the diffuser passage being disposed between an inner wall surface of the body and a conical lateral surface of the passage formation member. A drive mechanism that displaces the passage formation member in a direction along a center axis is coupled to an upstream actuating bar which extends from the passage formation member toward the inflow space and is slidably supported by the body. Center axes of the passage formation member, the upstream actuating bar and the inflow space are coaxial with each other.

12 Claims, 15 Drawing Sheets

(51) Int. Cl.
 *F04F 5/20* (2006.01)
 *F04F 5/46* (2006.01)
 *B60H 1/32* (2006.01)

(56) References Cited

U.S. PATENT DOCUMENTS

| | | |
|---|---|---|
| 2014/0020424 A1 | 1/2014 | Suzuki et al. |
| 2015/0033790 A1* | 2/2015 | Yamada .................. F04F 5/463 62/500 |
| 2015/0300706 A1* | 10/2015 | Awa ................... B60H 1/00921 62/324.6 |
| 2016/0047586 A1 | 2/2016 | Kayano et al. |
| 2016/0186782 A1 | 6/2016 | Nakashima et al. |
| 2017/0211850 A1 | 7/2017 | Fukushima et al. |
| 2017/0211857 A1 | 7/2017 | Takeichi et al. |

FOREIGN PATENT DOCUMENTS

| | | | |
|---|---|---|---|
| JP | 2014126225 A | 7/2014 | |
| JP | 2014190229 A | 10/2014 | |
| JP | 2014206147 A | 10/2014 | |
| JP | 2014206361 A | * 10/2014 | ......... B60H 1/00921 |
| JP | 5640857 B2 | 12/2014 | |
| JP | 2015031184 A | 2/2015 | |
| JP | 2016035376 A | 3/2016 | |
| WO | WO-2016017098 A1 | 2/2016 | |
| WO | WO-2016143300 A1 | 9/2016 | |
| WO | WO-2016185664 A1 | 11/2016 | |
| WO | WO-2017135092 A1 | 8/2017 | |
| WO | WO-2017135093 A1 | 8/2017 | |

* cited by examiner

COMPARATIVE EXAMPLE

US 11,053,956 B2

EJECTOR

CROSS REFERENCE TO RELATED APPLICATIONS

This application is a U.S. National Phase Application under 35 U.S.C. 371 of International Application No. PCT/JP2017/002204 filed on Jan. 24, 2017 and published in Japanese as WO 2017/135093 A1 on Aug. 10, 2017. This application is based on and claims the benefit of priority from Japanese Patent Applications No. 2016-018067 filed on Feb. 2, 2016, and No. 2016-248885 filed on Dec. 22, 2016. The entire disclosures of all of the above applications are incorporated herein by reference.

TECHNICAL FIELD

The present disclosure relates to an ejector that reduces a pressure of a fluid, and draws the fluid due to a suction action of a jet fluid jetted at high speed.

BACKGROUND ART

Up to now, Patent Literature 1 discloses an ejector that is applied to a vapor-compression refrigeration cycle device. In the ejector disclosed in Patent Literature 1, a refrigerant that flows out of an evaporator through a refrigerant suction port provided in a body is drawn by a suction action of supersonic jet refrigerant jetted from a nozzle passage for reducing the pressure of the refrigerant. Then, in a diffuser passage, a mixture refrigerant of the jet refrigerant and a suction refrigerant (that is, the refrigerant on an evaporator outlet side) is raised in pressure and flow out to an intake side of a compressor.

In more detail, in the ejector disclosed in Patent Literature 1, a passage formation member, which is a substantially conical valve body portion, is disposed inside the body, and a refrigerant passage having an annular cross section is provided between an inner surface of the body and a conical lateral surface of the passage formation member. A portion of the refrigerant passage on a most upstream side in a refrigerant flow is used as a nozzle passage, and a portion of the refrigerant passage on a downstream side of the nozzle passage in the refrigerant passage is used as a diffuser passage.

Further, in Patent Literature 1, a swirling space is provided in the body of the ejector to swirl the refrigerant flowing into the nozzle passage around a center axis of the passage formation member. In the swirling space, a liquid-phase refrigerant flowing out of a radiator is swirled so that the refrigerant on a swirling center side is reduced in pressure and boiled. Then, the refrigerant in a two-phase separation state in which a columnar gas-phase refrigerant (hereinafter referred to as "gas column") is generated on a swirling center side flows into the nozzle passage.

With the above configuration, in the ejector disclosed in Patent Literature 1, the boiling of the refrigerant in the nozzle passage is promoted and an energy conversion efficiency when converting a pressure energy of the refrigerant into a kinetic energy in the nozzle passage is to be improved. In addition, the energy conversion efficiency of the ejector as a whole (hereinafter referred to as "ejector efficiency") is to be improved.

Further, the ejector disclosed in Patent Literature 1 includes a drive mechanism that displaces the passage formation member to change a passage cross-sectional area of the refrigerant passage. As a result, in the ejector disclosed in Patent Literature 1, the ejector is intended to be operated appropriately with a change in the passage cross-sectional area of the refrigerant passage according to a load variation of the applied refrigeration cycle device.

PRIOR ART LITERATURE

Patent Literature

Patent Literature 1: JP 2013-177879 A

SUMMARY

However, as a result of the present inventors' studies on the ejector disclosed in Patent Literature 1 for the purpose of further improving the ejector efficiency, the high ejector efficiency cannot be stably exercised in some cases in the ejector of Patent Literature 1. Therefore, the present inventors have investigated causes of the above trouble, as a result of which the present inventors have found out the following causes.

First, in the ejector disclosed in Patent Literature 1, a portion of the passage formation member on an outer peripheral side and a drive mechanism are coupled to each other through multiple actuating bars. For that reason, when the passage formation member is displaced according to the load variation of the refrigeration cycle device, the center axis of the passage formation member is inclined from the center axis of the swirling space or the like in some cases. When the center axis of the passage formation member is inclined, the passage cross-sectional area of the refrigerant passage having the annular cross section varies in a circumferential direction.

For that reason, since a circumferential velocity distribution is generated in the jet refrigerant jetted from the nozzle, the energy conversion efficiency in the nozzle passage is lowered, and the suction refrigerant cannot be uniformly drawn in the circumferential direction.

Furthermore, if the center axis of the passage formation member is inclined, a configuration of the gas column occurring in the swirling space meanders and becomes unstable. As a result, the ejector efficiency is lessened.

In addition, when the ejector of Patent Literature 1 is applied to a refrigeration cycle device that employs refrigerants different in a physical property, the amount of refrigerant or the like required for causing the refrigeration cycle device to exercise a desired refrigeration capacity changes. For that reason, even if the refrigerants different in the physical property are swirled in the swirling space having the same shape, an appropriate gas column cannot be generated stably and the energy conversion efficiency in the nozzle passage cannot be improved.

Further, in the ejector disclosed in Patent Literature 1, the jet refrigerant jetted from the nozzle passage at a supersonic speed has a velocity component in the swirl direction. For that reason, an oblique impact wave occurring in the jet refrigerant also occurs along a swirling flow to accelerate the velocity component in a swirl direction of the jet refrigerant. As a result, a velocity difference between a flow velocity of the jet refrigerant and a flow velocity of the suction refrigerant is increased, to thereby be likely to increase an energy loss (hereinafter referred to as "mixing loss") at the time of mixing the jet refrigerant and the suction refrigerant together.

In this case, in order to reduce an increase in the mixing loss, it is conceivable to accelerate the suction refrigerant to reduce the velocity difference. However, in the ejector of Patent Literature 1, the passage formation member is provided, and a refrigerant outlet of the suction passage is opened annularly on an outer circumferential side of a refrigerant ejection port of the nozzle passage. For that reason, in the ejector disclosed in Patent Literature 1, even if the suction refrigerant is simply accelerated to reduce the velocity difference, it is difficult to sufficiently reduce the mixing loss.

The reason is because when the suction refrigerant is accelerated and merged from the outer peripheral side of the jet refrigerant, droplets in the jet refrigerant flowing into the mixing passage for mixing the jet refrigerant and the suction refrigerant together are unevenly distributed or attached to the passage formation member side. Therefore, in the ejector disclosed in Patent Literature 1, even if the suction refrigerant is accelerated, the droplets are less likely to be uniformly distributed in the mixing passage, and the mixing loss is less likely to be sufficiently reduced.

In view of the above points, the present disclosure aims to provide an ejector capable of stably exercising a high energy conversion efficiency.

According to one aspect of the present disclosure, an ejector applied to a vapor-compression refrigeration cycle device includes a body, a passage formation member and a drive mechanism. The body includes an inflow space configured to allow a liquid-phase refrigerant to flow thereinto, a pressure reducing space configured to reduce a pressure of the refrigerant that has flowed out of the inflow space, a suction passage communicating with a downstream side of the pressure reducing space in a refrigerant flow and allowing the refrigerant drawn from a refrigerant suction port to flow therethrough, and a pressurizing space configured to introduce therein a jet refrigerant jetted from the pressure reducing space and a suction refrigerant drawn through the suction passage. The passage formation member is at least partially disposed inside the pressure reducing space, and the passage formation member and the body define a refrigerant passage therebetween. The drive mechanism is configured to displace the passage formation member. A refrigerant passage defined between an inner peripheral surface of the body defining the pressure reducing space and an outer peripheral surface of the passage formation member is a nozzle passage functioning as a nozzle which reduces the pressure of the refrigerant and jets the refrigerant. The passage formation member is coupled to an upstream actuating bar that extends toward the inflow space and is slidably supported by the body. A center axis of the inflow space, a center axis of the upstream actuating bar, and a center axis of the passage formation member are coaxially disposed.

According to the configuration described above, since the drive mechanism displaces the passage formation member, the passage cross-sectional area of the nozzle passage can be adjusted according to a load variation of the applied refrigeration cycle device.

In that situation, since the passage formation member is supported by the upstream actuating bar disposed coaxially, even if the drive mechanism displaces the passage formation member, the center axis of the passage formation member can be prevented from being inclined. This makes it possible to prevent the ejector efficiency from becoming unstable with the inclination of the center axis of the passage formation member.

Furthermore, since the upstream actuating bar extends toward the inflow space and the center axis of the upstream actuating bar and the center axis of the inflow space are coaxially disposed, swirling flow hardly occurs in the refrigerant in the inflow space, and no gas column occurs in the inflow space. Therefore, there is no case in which the configuration of the gas column becomes unstable, thereby making the ejector efficiency unstable.

In addition, since the swirling flow hardly occurs in the refrigerant in the inflow space, an increase in the mixing loss at the time of mixing the jet refrigerant and the suction refrigerant together can be reduced. As a result, the ejector efficiency can be improved.

In other words, according to the ejector of the above aspect, the high energy conversion efficiency can be stably exercised regardless of the load variation of the applied refrigeration cycle device.

The passage formation member may be at least partially disposed inside the pressurizing space. A refrigerant passage defined between an inner peripheral surface of the body defining the pressurizing space and the outer peripheral surface of the passage formation member may be a diffuser passage functioning as a pressure increase portion which mixes and pressurizes the jet refrigerant and the suction refrigerant.

According to the configuration described above, the passage cross-sectional area of the diffuser passage can be adjusted according to the load variation of the applied refrigeration cycle device. Therefore, the high energy conversion efficiency can be more stably exercised regardless of the load variation of the applied refrigeration cycle device.

In addition, the passage formation member may be coupled with a downstream actuating bar that extends to the downstream side of the diffuser passage and is slidably supported by the body. According to the above configuration, since the passage formation member can be supported at both end sides of the center axis by the upstream actuating bar and the downstream actuating bar, the center axis of the passage formation member can be more reliably prevented from being inclined.

DESCRIPTION OF EMBODIMENTS

Figure 1:
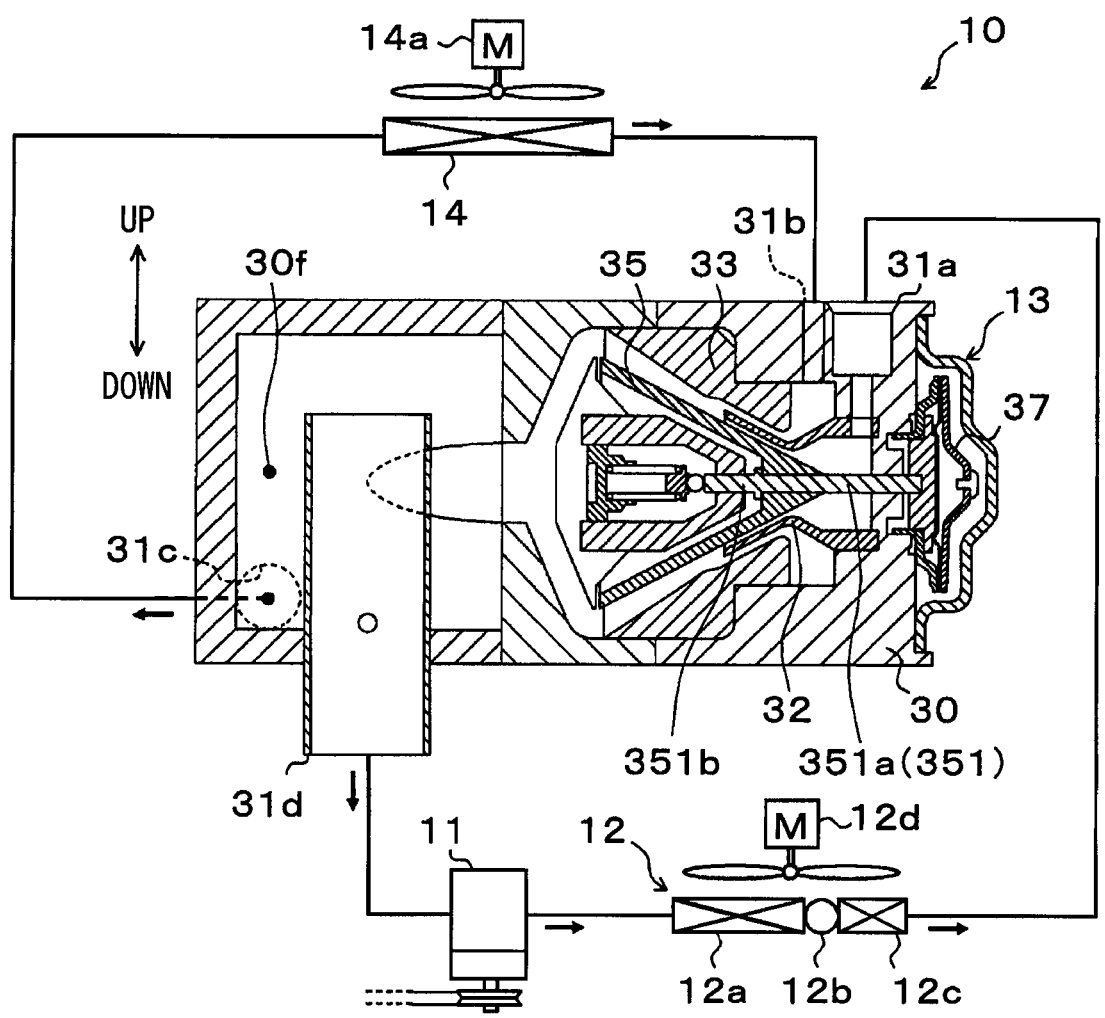
FIG. 1 is a schematic diagram of an ejector refrigeration cycle according to a first embodiment.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 8. As illustrated in FIG. 1, an ejector 13 of the present embodiment is applied to a vapor-compression refrigeration cycle device including an ejector as a refrigerant pressure reducing device, that is, an ejector refrigeration cycle 10. Moreover, the ejector refrigeration cycle 10 is applied to a vehicle air conditioner, and performs a function of cooling a blown air to be blown into a vehicle interior that is an air-conditioning target space. Therefore, a cooling target fluid in the ejector refrigeration cycle 10 according to the present embodiment is the blown air.

In addition, the ejector refrigeration cycle 10 according to the present embodiment employs an HFO based refrigerant (specifically, R1234yf) as the refrigerant, and forms a subcritical refrigeration cycle in which a high-pressure side refrigerant pressure does not exceed a critical pressure of the refrigerant. A refrigerator oil for lubricating a compressor 11 is mixed with the refrigerant, and a part of the refrigerator oil is circulated in the cycle together with the refrigerant.

The compressor 11 that is one configuration equipment of the ejector refrigeration cycle 10 draws the refrigerant, raises a pressure of the refrigerant to a high-pressure refrigerant, and discharges the refrigerant. The compressor 11 is disposed in an engine compartment together with an engine (internal combustion engine) which outputs a vehicle traveling driving force. Furthermore, the compressor 11 is an engine-driven-type compressor that is driven by a rotational drive power output from the engine through a pulley, a belt, and the like.

In more detail, in the present embodiment, the compressor 11 employs a swash plate type variable capacity type compressor that is configured so that a refrigerant discharge capacity can be adjusted by changing a discharge volume. The compressor 11 has a discharge capacity control valve not shown for changing the discharge capacity.

The operation of the discharge capacity control valve is controlled according to a control current output from a control device to be described later.

A refrigerant inlet side of a condensing portion 12a of a radiator 12 is connected to a discharge port of the compressor 11. The radiator 12 is a radiation heat exchanger that performs a heat exchange between a high-pressure refrigerant discharged from the compressor 11 and a vehicle exterior air (outside air) blown by a cooling fan 12d to radiate the heat from the high-pressure refrigerant and cool the high-pressure refrigerant. The radiator 12 is disposed on a front side of the vehicle in the engine compartment.

More specifically, the radiator 12 is a so-called subcooling condenser which includes a condensing portion 12a, a receiver portion 12b, and a subcooling portion 12c.

The condensing portion 12a is a condensation heat exchanging unit that performs the heat exchange between the high pressure gas-phase refrigerant discharged from the compressor 11 and the outside air blown from the cooling fan 12d and radiates and condenses the high-pressure gas-phase refrigerant. The receiver portion 12b is a refrigerant container that separates the refrigerant that has flowed out of the condensing portion 12a into gas and liquid, and accumulates an excess liquid-phase refrigerant. The subcooling portion 12c is a heat exchanging unit that performs the heat exchange between a liquid-phase refrigerant that has flowed out of the receiver portion 12b and the outside air blown from the cooling fan 12d, and super-cools the liquid-phase refrigerant.

The cooling fan 12d is an electric blower, a rotating speed (that is, blown air amount) of which is controlled according to a control voltage output from the control device. A refrigerant inflow port 31a of the ejector 13 is connected to a refrigerant outlet side of the subcooling portion 12c of the radiator 12.

The ejector 13 has a function of a refrigerant pressure reducing device that reduces a pressure of a high-pressure refrigerant in a subcooling state which has flowed out of the radiator 12 and allows the refrigerant to flow to the downstream side. Further, the ejector 13 has a function of a refrigerant transport device that draws and transports a refrigerant (that is, an evaporator 14 outlet side refrigerant) that has flowed out of an evaporator 14 to be described later by a suction action of a jet refrigerant jetted at a high speed.

In addition, the ejector 13 according to the present embodiment functions as a gas-liquid separator for separating the pressure reduced refrigerant into gas and liquid. In other words, the ejector 13 according to the present embodiment is configured as an ejector integrated with a gas-liquid separation function in which the ejector and the gas-liquid separator are integrated with each other (that is, modularized).

The ejector 13 is disposed in the engine compartment together with the compressor 11 and the radiator 12. Incidentally, respective up and down arrows in FIG. 1 indicate up and down directions in a state where the ejector 13 is mounted in the vehicle, and the respective up and down directions in a state where other equipment of the ejector refrigeration cycle 10 is mounted in the vehicle are not limited to the above arrows.

Figure 2:
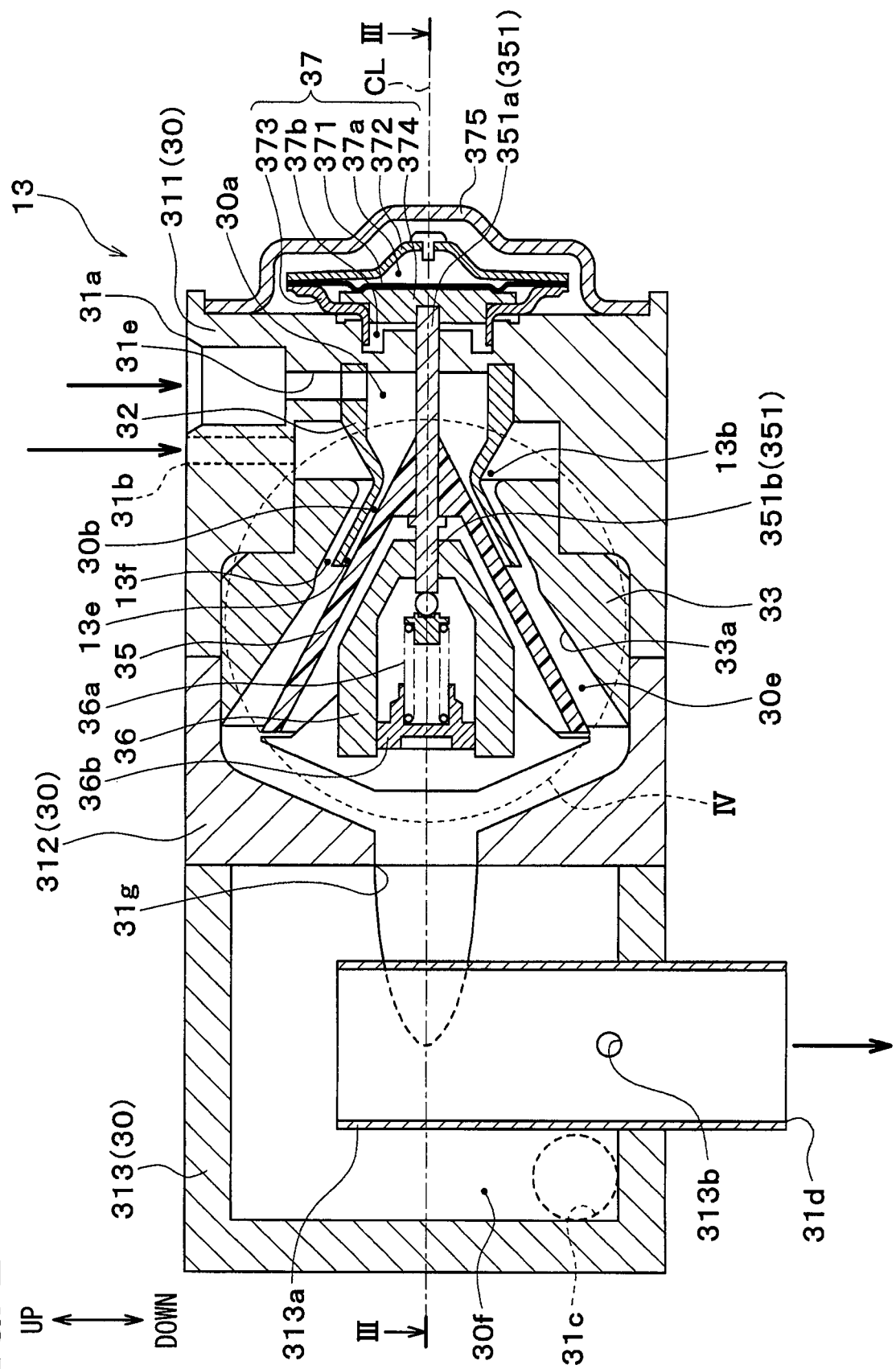
FIG. 2 is a cross-sectional view of an ejector according to the first embodiment.
Figure 3:
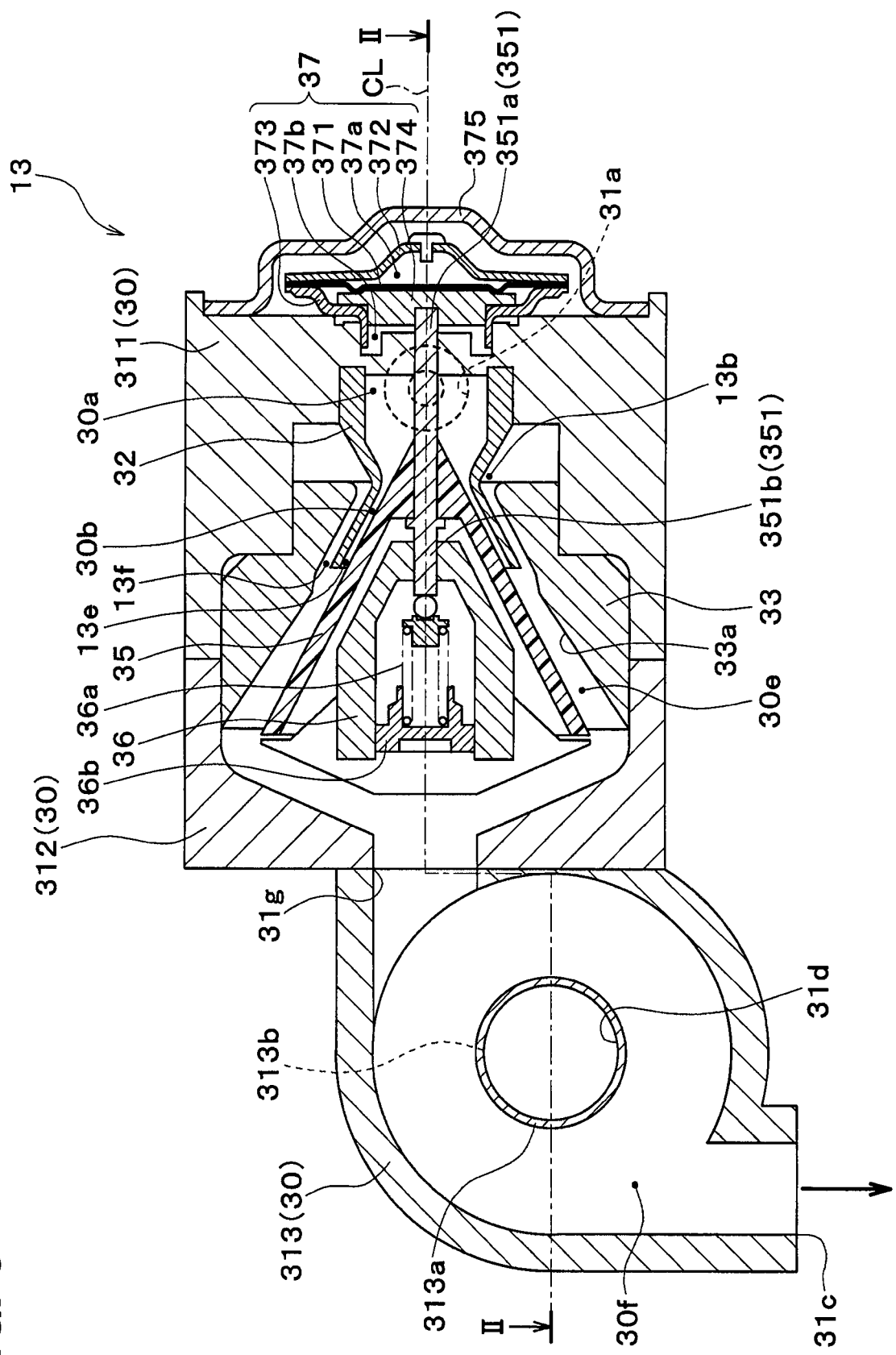
FIG. 3 is a cross-sectional view taken along a line III-III of FIG. 2.

A specific configuration of the ejector 13 will be described with reference to FIGS. 2 to 4. The respective up and down arrows in FIG. 2 indicate up and down directions in a state where the ejector refrigeration cycle 10 is mounted on a vehicle air conditioner. FIGS. 2 and 3 are axial cross-sectional views of the ejector 13, FIG. 2 is a cross-sectional view taken along a line II-II in FIG. 3, and FIG. 3 is a cross-sectional view taken along a line III-III in FIG. 2.

Figure 4:
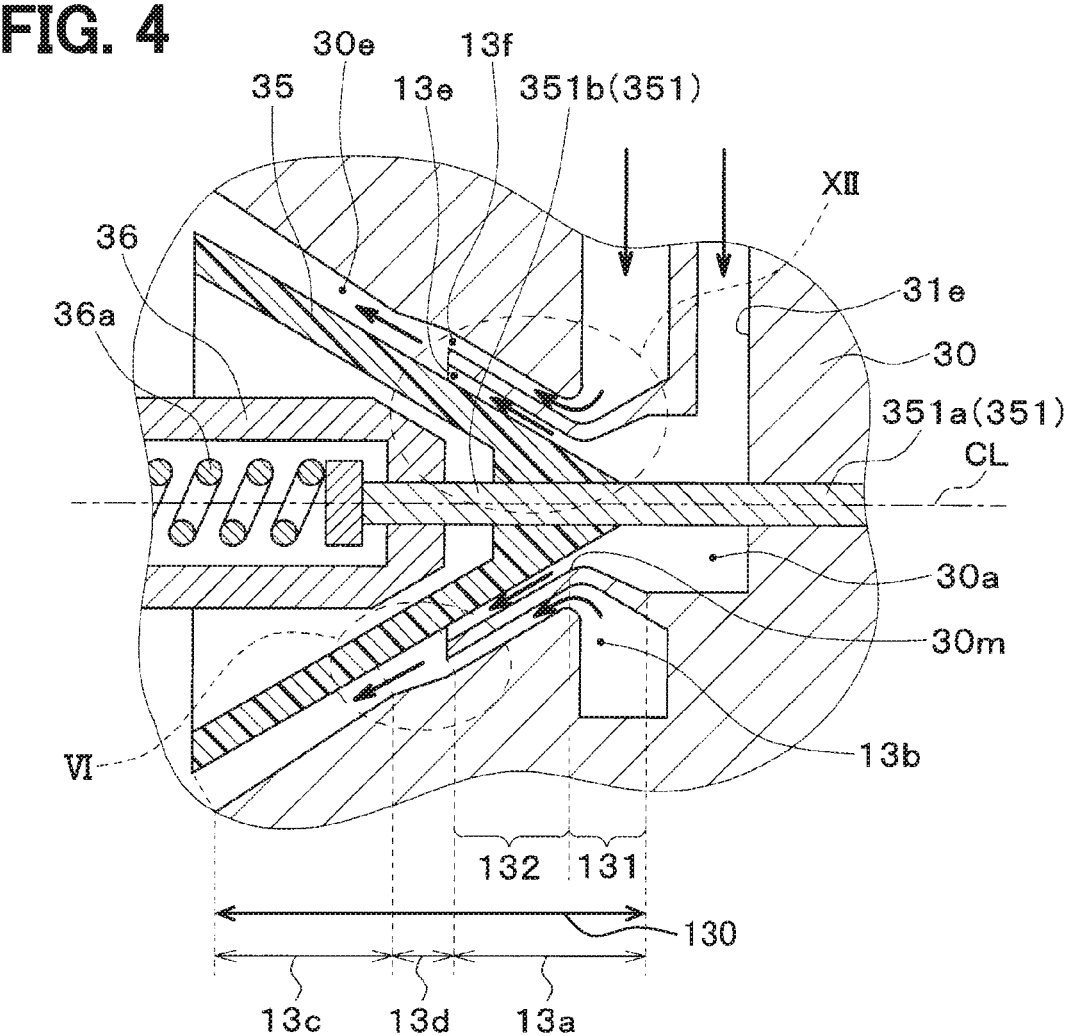
FIG. 4 is a schematic cross-sectional view of a part IV in FIG. 2.

FIG. 4 is a partially enlarged schematic cross-sectional view illustrating a refrigerant passage 130 provided inside the ejector 13, and the same parts as those in FIGS. 2 and 3 are denoted by identical symbols.

As illustrated in FIGS. 2 and 3, the ejector 13 according to the present embodiment includes a body 30 configured by combining the multiple components together.

More specifically, the body 30 includes an upper body 311, a lower body 312, a gas-liquid separation body 313, and the like. The respective bodies 311 to 313 form an outer shell of the ejector 13 and also functions as a housing for internally accommodating other components. The housing bodies 311 to 313 are formed of a hollow member made of metal (in the present embodiment, made of aluminum alloy). It should be noted that the housing bodies 311 to 313 may be made of resin.

In an internal space defined by combining the upper body 311 and the lower body 312 together, the components of the body 30 such as a nozzle 32 and a diffuser body 33 which will be described later are fixed.

The upper body 311 is provided with multiple refrigerant inflow ports such as the refrigerant inflow port 31a and a refrigerant suction port 31b. The refrigerant inflow port 31a is a refrigerant inflow port through which the refrigerant that has flowed out of the radiator 12 flows. The refrigerant suction port 31b is a refrigerant inflow port for drawing the refrigerant that has flowed out of the evaporator 14.

The gas-liquid separation body 313 is provided with multiple refrigerant inflow and outflow ports such as a liquid-phase refrigerant outflow port 31c and a gas-phase refrigerant outflow port 31d. The liquid-phase refrigerant outflow port 31c is a refrigerant outflow port through which the liquid-phase refrigerant separated in the gas-liquid separation space 30f defined in the gas-liquid separation body 313 flows out to a refrigerant inlet side of the evaporator 14. The gas-phase refrigerant outflow port 31d is a refrigerant outflow port through which the gas-phase refrigerant separated in the gas-liquid separation space 30f flows out to an intake port side of the compressor 11.

The nozzle 32 is formed of a cylindrical member made of metal (in the present embodiment, made of stainless steel). As shown in FIGS. 2 and 3, the nozzle 32 is disposed on a bottom surface of the upper body 311 on an axial one end side of the upper body 311 (opposite side to the lower body 312). The nozzle 32 is fixed into a hole provided in the upper body 311 by press fitting so that no refrigerant leaks through a gap between the upper body 311 and the nozzle 32.

An inside of the nozzle 32 is provided with an inflow space 30a into which the refrigerant flowing through the refrigerant inflow port 31a flows. The inflow space 30a is formed in a shape of a substantially columnar rotating body. A center axis of the inflow space 30a is disposed coaxially with a center axis CL of a passage formation member 35 which will be described later. As is apparent from FIGS. 2 and 3, the center axis CL of the present embodiment extends in a substantially horizontal direction. Incidentally, the shape of the rotating body is a cubic shape formed when a plane figure is rotated around one straight line (center axis) on the same plane.

The upper body 311 is provided with a refrigerant inflow passage 31e that guides the refrigerant flowing from the refrigerant inflow port 31a to the inflow space 30a side. The refrigerant inflow passage 31e is formed in a shape extending in a radial direction when viewed from a direction of the center axis of the inflow space 30a and is formed so as to allow the refrigerant flowing into the inflow space 30a to flow toward the center axis of the inflow space 30a.

A pressure reducing space 30b is defined in an interior of the nozzle 32 and on the downstream side of the inflow space 30a in the refrigerant flow to reduce the pressure of the refrigerant that has flowed out of the inflow space 30a and allow the refrigerant to flow out to the downstream side. The pressure reducing space 30b is formed in a shape of a rotating body in which top sides of two truncated cone shaped spaces are coupled to each other. The center axis of the pressure reducing space 30b is also disposed coaxially with the center axis CL of the passage formation member 35.

A top side of a conical passage formation member 35 is disposed in the interior of the pressure reducing space 30b. The passage formation member 35 is a valve body portion that is disposed in a refrigerant passage 130 provided inside the body 30. The passage formation member 35 performs a function of changing the passage cross-sectional area of the refrigerant passage 130 by displacement in the center axis CL direction.

More specifically, the passage formation member 35 is formed of a conical member made of a resin (made of nylon 6 or nylon 66 in the present embodiment) having resistance to refrigerant. The passage formation member 35 is formed in a conical shape with an outer diameter enlarged more as the passage formation member 35 moves more away from the pressure reducing space 30b (that is, toward the downstream side in the refrigerant flow).

In addition, a substantially truncated conical space is provided from the bottom surface side of the passage formation member 35 inside the passage formation member 35. In other words, the passage formation member 35 is formed in a cup shape (that is, a cup shape). Further, a shaft 351 is coupled to the passage formation member 35. The shaft 351 is formed of a cylindrical rod member made of metal (in the present embodiment, made of stainless steel). A center axis of the shaft 351 is disposed coaxially with the center axis CL of the passage formation member 35.

The shaft 351 is insert-molded in the passage formation member 35. As a result, the passage formation member 35 and the shaft 351 are integrated together. Further, the shaft 351 includes an upstream actuating bar 351a corresponding to an upstream end and a downstream actuating bar 351b corresponding to a downstream end. Therefore, a center axis of the upstream actuating bar 351a and a center axis of the downstream actuating bar 351b are also disposed coaxially with each other.

The upstream actuating bar 351a extends from the top of the passage formation member 35 so as to penetrate through the inflow space 30a and is slidably supported in a bearing hole of the upper body 311. The downstream actuating bar 351b extends from the top of the passage formation member 35 toward the downstream side of the diffuser passage 13c to be described later and is slidably supported in a bearing hole of the support member 36 provided in the lower body 312. In other words, the shaft 351 is slidably supported by the body 30 at both axial end sides.

The support member 36 is formed of a cylindrical member made of a metal (in the present embodiment, an aluminum alloy), and is fixed to the lower body 312 through a fixing member not shown. Further, a coil spring 36a for applying a load directed at the inflow space 30a side to the downstream actuating bar 351b is accommodated inside the support member 36. The load of the coil spring 36a can be adjusted by an adjustment screw provided on the support member 36.

A leading end portion of the upstream actuating bar 351a on the inflow space 30a side is coupled to the drive mechanism 37. The drive mechanism 37 outputs a driving force for displacing the shaft 351 and the passage formation member 35 in the axial direction. Details of the drive mechanism 37 will be described later.

Next, a description will be given of a nozzle passage 13a of the refrigerant passage 130 that is defined between an outer peripheral surface of the passage formation member 35 on the top side (that is, the inflow space 30a side) and an inner peripheral surface of a portion defining the pressure reducing space 30b of the nozzle 32, and through which the refrigerant that has flowed out of the inflow space 30a flows.

The nozzle passage 13a functions as a nozzle which reduces the pressure of the refrigerant and jets the refrigerant. An axial vertical cross-section of the nozzle passage 13a is formed into an annular shape (a shape excluding a small diameter circular shape disposed coaxially from a circular shape). As shown in FIG. 4, a convergent portion 131 and a divergent portion 132 are formed in the nozzle passage 13a.

The convergent portion 131 is a part of the refrigerant passage 130 that is provided on the refrigerant flow upstream side of a smallest passage area portion 30m in which the passage cross-sectional area is most reduced in the nozzle passage 13a. In the convergent portion 131, a passage cross-sectional area up to the smallest passage area portion 30m is gradually reduced. The divergent portion 132 is a part of the refrigerant passage 130 that is provided on a downstream side of the smallest passage area portion 30m in the refrigerant flow, in which the passage cross-sectional area is gradually enlarged.

In other words, in the nozzle passage 13a according to the present embodiment, the passage cross-sectional area is changed as with "Laval nozzle". Further, in the nozzle passage 13a, the refrigerant is reduced in pressure, accelerated so that a flow rate of the refrigerant reaches a supersonic speed, and jetted.

Next, as shown in FIGS. 2 and 3, the diffuser body 33 is disposed on the downstream side of the nozzle 32 inside the upper body 311 in the refrigerant flow. The diffuser body 33 is formed of a cylindrical member made of metal (in the present embodiment, an aluminum alloy). The diffuser body 33 may be divided into multiple members so that a refrigerant ejection port 13e side of the nozzle 32 can be accommodated in the through hole 33a provided inside the diffuser body 33.

An outer peripheral side of the diffuser body 33 is press-fitted into an inner peripheral side surface of the upper body 311 so that the diffuser body 33 is fixed to the upper body 311. Incidentally, an O-ring is disposed as a sealing member not shown between the diffuser body 33 and the upper body 311 so that no refrigerant leaks from a gap between those members.

A through hole 33a penetrating in the axial direction is provided in a central portion of the diffuser body 33. The through hole 33a is formed in a shape of a substantially truncated conical rotating body, and a center axis of the through hole 33a is disposed coaxially with the center axis CL of the passage formation member 35. Furthermore, in the present embodiment, a leading end portion of the nozzle 32 on the side of the refrigerant ejection port 13e extends to an inside of the through hole 33a of the diffuser body 33.

A suction passage 13b is provided between an inner peripheral surface of the through hole 33a of the diffuser body 33 and an outer peripheral surface of the leading end portion of the nozzle 32. The suction passage 13b guides the refrigerant drawn from the refrigerant suction port 31b to the refrigerant flow downstream side of the pressure reducing space 30b (that is, the nozzle passage 13a). For that reason, when viewed from the direction of the center axis CL, a suction refrigerant outlet 13f, which is the most downstream portion of the suction passage 13b, opens annularly on an outer peripheral side of the refrigerant ejection port 13e.

A pressurizing space 30e is formed in the through hole 33a of the diffuser body 33 on the downstream side of the suction passage 13b in the refrigerant flow. The pressurizing space 30e is formed into a substantially truncated conical shape that gradually spreads in the refrigerant flow direction. The pressurizing space 30e is a space into which the jet refrigerant jetted from the nozzle passage 13a described above and the suction refrigerant drawn from the suction passage 13b flow.

The lower side of the passage formation member 35 is located inside the pressurizing space 30e. A mixing passage 13d and a diffuser passage 13c are provided between an inner peripheral surface of a portion defining the pressurizing space 30e of the diffuser body 33 and an outer peripheral surface of a lower side of the passage formation member 35. The mixing passage 13d is a refrigerant passage in which the jet refrigerant and the suction refrigerant are mixed together. The diffuser passage 13c is a part of the refrigerant passage 130 in which the mixture refrigerant of the jet refrigerant and the suction refrigerant is increased in pressure.

The mixing passage 13d is disposed on the upstream side of the diffuser passage 13c in the refrigerant flow. The mixing passage 13d is formed into a shape gradually reduced in the passage cross-sectional area toward the downstream side in the refrigerant flow. More specifically, as shown in FIG. 4, an outline of a wall surface defining the mixing passage 13d in the diffuser body 33 on an axial cross-sectional plane including the center axis CL is inclined to come closer to the passage formation member 35 side toward the refrigerant flow downstream side. As a result, the passage cross-sectional area of the mixing passage 13d is reduced toward the downstream side in the refrigerant flow.

Furthermore, a smallest passage cross-sectional area of the mixing passage 13d is set to be smaller than a total of a passage cross-sectional area of the refrigerant ejection port 13e and a passage cross-sectional area of the suction refrigerant outlet 13f.

The diffuser passage 13c is formed into a shape gradually reduced in the passage cross-sectional area toward the downstream side in the refrigerant flow. As a result, in the diffuser passage 13c, a velocity energy of the mixture refrigerant can be converted into a pressure energy. Therefore, the diffuser passage 13c functions as a diffuser portion (pressure increase portion). Both of the mixing passage 13d and the diffuser passage 13c have an annular cross-sectional shape perpendicular to the center axis.

In this example, as shown in FIG. 4, the nozzle passage 13a may be defined as a part of the refrigerant passage 130 provided in a range where a line segment extending in a normal direction from the outer peripheral surface of the passage formation member 35 intersects with a portion of the nozzle 32 which defines the pressure reducing space 30b. The diffuser passage 13c may be defined as a part of the refrigerant passage 130 provided in a range where a line segment extending in the normal direction from the outer peripheral surface of the passage formation member 35 intersects with a portion of the diffuser body 33 which defines the pressurizing space 30e.

The suction refrigerant outlet 13f of the suction passage 13b in the cross-sectional view of FIG. 4 may be defined by a line segment extending in a direction normal to the outer peripheral surface of the passage formation member 35, which is a line segment extending a leading end portion of the refrigerant ejection port 13e of the nozzle 32 to the diffuser body 33.

The mixing passage 13d may be defined as a part of the refrigerant passage 130 that connects the nozzle passage 13a, the suction passage 13b, and the diffuser passage 13c. Further, the smallest passage cross-sectional area of the mixing passage 13d is a passage cross-sectional area at the most downstream portion of the mixing passage 13d in the refrigerant flow (that is, the most upstream portion of the diffuser passage 13c in the refrigerant flow).

Further, the nozzle passage 13a, the suction passage 13b, the diffuser passage 13c, and the mixing passage 13d are defined between the outer peripheral surface of the passage formation member 35 and the inner peripheral surface of the body 30 (specifically, the nozzle 32 and the diffuser body 33).

For that reason, with the adjustment of an angle between the center axis CL and the outer peripheral surface of the passage formation member 35 and an angle between the center axis CL and the inner peripheral surface of the body 30, even if the passage cross-sectional area is kept constant toward the downstream side in the refrigerant flow, a width in the radial direction (flow channel width) of each passage can be increased or decreased toward the downstream side in the refrigerant flow.

Next, the drive mechanism 37 will be described. Further, the drive mechanism 37 changes the refrigerant passage cross-sectional area of the smallest passage area portion 30m of the nozzle passage 13a with the displacement of the passage formation member 35. As shown in FIGS. 2 and 3, the drive mechanism 37 is disposed outside the upper body 311 and on an axial extension line of the upstream actuating bar 351a. The drive mechanism 37 includes a diaphragm 371, an upper cover 372, a lower cover 373, and the like.

The upper cover 372 forms an enclosure space formation member that forms a part of an enclosure space 37a in cooperation with the diaphragm 371. The upper cover 372 forms a cup-shaped member formed of metal (stainless steel in the present embodiment).

The enclosure space 37a is a space filled with a temperature sensitive medium whose pressure varies with a change in temperature. In more detail, the enclosure space 37a is a space in which the temperature sensitive medium having a composition comparable to that of the refrigerant circulating through the ejector refrigeration cycle 10 is enclosed with a predetermined enclosure density.

Therefore, as the temperature sensitive medium of the present embodiment, a medium containing R1234yf as a main component (for example, a mixed medium of R1234yf and helium) can be adopted. Further, the enclosure density of the temperature sensitive medium is set so as to appropriately displace the passage formation member 35 during normal operation of the cycle as will be described later.

The lower cover 373 forms an introduction space formation member that defines an introduction space 37b in cooperation with the diaphragm 371. The lower cover 373 is formed of the same metal member as that of the upper cover 372. The introduction space 37b is a space into which the suction refrigerant drawn from the refrigerant suction port 31b is introduced through a communication passage not shown.

The outer peripheral edge portions of the upper cover 372 and the lower cover 373 are fixed to each other by swaging or the like. Further, the outer peripheral side edge of the diaphragm 371 is sandwiched between the upper cover 372 and the lower cover 373. As a result, the diaphragm 371 partitions a space provided between the upper cover 372 and the lower cover 373 into the enclosure space 37a and the introduction space 37b.

The diaphragm 371 is a pressure responsive member that displaces according to a pressure difference between an internal pressure of the enclosure space 37a and a pressure of the suction refrigerant flowing through the suction passage 13b. Therefore, it is preferable that the diaphragm 371 is made of a material which is rich in elasticity and excellent in pressure resistance and airtightness.

Therefore, in the present embodiment, the diaphragm 371 is formed of a metal thin plate made of stainless steel (SUS 304). In addition, the diaphragm 371 may be made of a rubber base material such as an EPDM (ethylene propylene diene rubber) containing a base fabric (polyester) or an HNBR (hydrogenated nitrile rubber).

A disk-shaped plate member 374 made of metal (aluminum alloy in the present embodiment) is disposed on the introduction space 37b side of the diaphragm 371. The plate member 374 is disposed so as to come in contact with the diaphragm 371. Further, a leading end portion of the upstream actuating bar 351a is coupled to the plate member 374. Therefore, the shaft 351 and the passage formation member 35 according to the present embodiment are displaced so that a total load of a load received from the drive mechanism 37 (specifically, the diaphragm 371) and a load received from the coil spring 36a is balanced.

More specifically, when a temperature (degree of superheat SH) of the refrigerant on the outlet side of the evaporator 14 rises, a saturation pressure of the temperature sensitive medium sealed in the enclosure space 37a rises and a pressure difference obtained by subtracting an internal pressure in the introduction space 37b from an internal pressure in the enclosure space 37a is increased. As a result, the diaphragm 371 is displaced to the introduction space 37b side, and the load received by the upstream actuating bar 351a from the drive mechanism 37 increases.

Therefore, when the temperature (degree of superheat SH) of the refrigerant on the outlet side of the evaporator 14 rises, the passage formation member 35 is displaced in a direction of enlarging the passage cross-sectional area in the smallest passage area portion 30m.

On the other hand, when a temperature (degree of superheat SH) of the refrigerant on the outlet side of the evaporator 14 decreases, the saturation pressure of the temperature sensitive medium sealed in the enclosure space 37a decreases and a pressure difference obtained by subtracting the internal pressure in the introduction space 37b from the internal pressure in the enclosure space 37a is reduced. As a result, the diaphragm 371 is displaced to the side of the enclosure space 37a, and the load applied to the upstream actuating bar 351a from the drive mechanism 37 is reduced.

Accordingly, when the temperature (degree of superheat SH) of the refrigerant on the outlet side of the evaporator 14 decreases, the passage formation member 35 is displaced in a direction of reducing the passage cross-sectional area in the smallest passage area portion 30m.

In other words, the drive mechanism 37 of the present embodiment is configured by a mechanical mechanism, and the diaphragm 371 displaces the passage formation member 35 according to the degree of superheat SH of the refrigerant on the outlet side of the evaporator 14. The passage cross-sectional area of the smallest passage area portion 30m is adjusted so that the degree of superheat SH of the refrigerant on the outlet side of the evaporator 14 comes closer to a predetermined reference degree of superheat KSH. It should be noted that the reference degree of superheat KSH can be changed by adjusting the load of the coil spring 36a described above.

Furthermore, in the present embodiment, a cover member 375 that covers the drive mechanism 37 is disposed on an outer peripheral side of the drive mechanism 37. This prevents the temperature sensitive medium in the enclosure space 37a from being influenced by an outside air temperature in an engine compartment.

Next, as shown in FIGS. 2 and 3, the lower body 312 is provided with a mixture refrigerant outflow port 31g. The mixture refrigerant outflow port 31g is a refrigerant outflow port through which a gas-liquid mixed state refrigerant flowing out of the diffuser passage 13c flows out to the side of the gas-liquid separation space 31f provided in the gas-liquid separation body 313. A passage cross-sectional area of the mixture refrigerant outflow port 31g is set to be smaller than a passage cross-sectional area of the most downstream portion of the diffuser passage 13c.

The gas-liquid separation body 313 is formed in a cylindrical shape. A gas-liquid separation space 30f is defined inside the gas-liquid separation body 313. The gas-liquid separation space 30f is defined as a space having a substantially cylindrical rotating body shape. The center axes of the gas-liquid separation body 313 and the gas-liquid separation space 30f extend in the vertical direction. For that reason, the center axes of the gas-liquid separation body 313 and the gas-liquid separation space 30f are orthogonal to the center axis of the passage formation member 35 and the like.

Further, the gas-liquid separation body 313 is disposed so that the refrigerant flowing into the gas-liquid separation space 30f from the mixture refrigerant outflow port 31g of the lower body 312 flows along a wall surface of the gas-liquid separation space 30f on the outer peripheral side. As a result, in the gas-liquid separation space 30f, the gas-liquid of the refrigerant is separated by the action of a centrifugal force generated when the refrigerant is swirled around the center axis.

A cylindrical pipe 313a is disposed at an axial center portion of the gas-liquid separation body 313. The cylindrical pipe 313a is disposed coaxially with the gas-liquid separation space 30f and extends in the vertical direction. A liquid-phase refrigerant outflow port 31c is provided in a cylindrical side surface of the gas-liquid separation body 313 on the bottom surface side. The liquid-phase refrigerant outflow port 31c allows the liquid-phase refrigerant separated in the gas-liquid separation space 30f to flow out along an outer peripheral side wall surface of the gas-liquid separation space 30f. Further, a gas-phase refrigerant outflow port 31d is provided in a lower side end portion of the pipe 313a. The gas-phase refrigerant outflow port 31d allows the gas-phase refrigerant separated in the gas-liquid separation space 30f to flow out.

Further, an oil return hole 313b is provided in a root portion of the pipe 313a in the gas-liquid separation space 30f (that is, the lowermost portion in the gas-liquid separation space 30f). The oil return hole 313b communicates the gas-liquid separation space 30f with a gas-phase refrigerant passage defined in the pipe 313a. The oil return hole 313b is a communication passage for returning a refrigerator oil dissolved in the liquid-phase refrigerant to the compressor 11 through the gas-phase refrigerant outflow port 31d together with the liquid-phase refrigerant.

As shown in FIG. 1, the refrigerant inlet side of the evaporator 14 is connected to the liquid-phase refrigerant outflow port 31c of the ejector 13. The evaporator 14 is a heat-absorbing heat exchanger that exchanges a heat between a low-pressure refrigerant whose pressure is reduced by the ejector 13 and a blown air which is blown from a blower fan 14a into the vehicle interior, thereby evaporating the low-pressure refrigerant and exerting a heat absorbing action.

The blower fan 14a is an electric blower of which a rotation speed (the blown air amount) is controlled according to a control voltage output from the control device. The refrigerant suction port 31b of the ejector 13 is connected to an outlet side of the evaporator 14. Further, the gas-phase refrigerant outflow port 31d of the ejector 13 is connected with the intake port side of the compressor 11.

The control device not shown includes a well-known microcomputer including a CPU, a ROM and a RAM, and peripheral circuits of the microcomputer. The control device performs various calculations and processes based on a control program stored in the ROM. The control device controls the operation of the various electric actuators 11, 12d, 14a, and so on In addition, the control device is connected with multiple air conditioning control sensor groups such as an inside air temperature sensor, an outside air temperature sensor, an insolation sensor, an evaporator temperature sensor, and a discharge pressure sensor, and the control device receives detection values from those sensor groups.

In more detail, the inside air temperature sensor is an inside air temperature detection unit that detects a vehicle interior temperature. The outside air temperature sensor is an outside air temperature detection unit that detects an outside air temperature. The insolation sensor is a detection unit that detects the amount of insolation in the vehicle interior. The evaporator temperature sensor is an evaporator temperature detection unit that detects a blowing air temperature (evaporator temperature) from the evaporator 14. The discharge pressure sensor is an outlet side pressure detection unit that detects a pressure of the refrigerant on the outlet side of the radiator 12.

Furthermore, an operation panel not shown is connected to an input side of the control device. The operation panel is disposed in the vicinity of an instrument panel positioned at a front part in the vehicle interior. Operation signals output from various operation switches disposed on the operation panel are input to the control device. An air conditioning operation switch for requesting the execution of air conditioning in the vehicle interior, a vehicle interior temperature setting switch for setting the temperature of the vehicle interior, and the like are provided as the various operation switches that are mounted on the operation panel.

Meanwhile, the control device of the present embodiment is integrated with a control unit for controlling the operations of various control target devices connected to the output side of the control device, but a configuration of the control device (hardware and software), which controls the operations of the respective control target devices forms the control unit of the respective control target devices.

For example, in the present embodiment, a configuration which controls the operation of a discharge capacity control valve of the compressor 11 to control the refrigerant discharge capacity of the compressor 11 configures a discharge capacity control unit. It is needless to say that the discharge capacity control unit may be configured as another control device different from the control device.

Next, the operation of the present embodiment configured as described above will be described with reference to a Mollier diagram of FIG. 5. First, when the operation switch of the operation panel is turned on, the control device actuates the discharge capacity control valve, the cooling fan 12d, and the blower fan 14a, and so on of the compressor 11. With the above configuration, the compressor 11 draws, compresses, and discharges the refrigerant.

A high-temperature high-pressure refrigerant (a point a in FIG. 5) discharged from the compressor 11 flows into the condensing portion 12a of the radiator 12, exchanges a heat with an outside air blown from the cooling fan 12d, and radiates the heat and is condensed. The refrigerant condensed by the condensing portion 12a is separated into gas and liquid by the receiver portion 12b. The liquid-phase refrigerant, which has been subjected to gas-liquid separation by the receiver portion 12b, exchanges a heat with an outside air blown from the cooling fan 12d by the subcooling portion 12c. The liquid-phase refrigerant further radiates the heat to provide a subcooled liquid-phase refrigerant (from a point a to a point b in FIG. 5).

Figure 5:
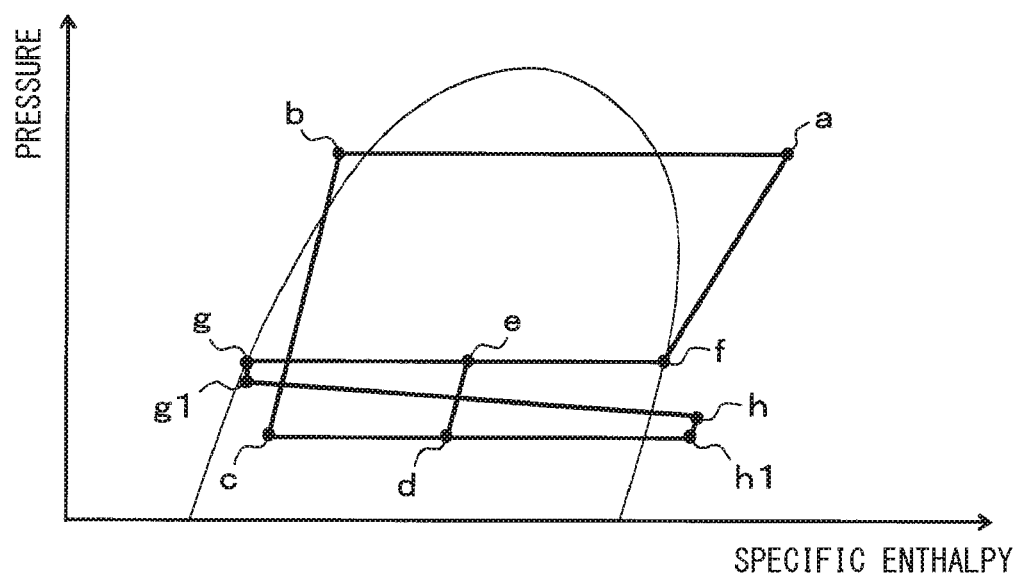
FIG. 5 is a Mollier diagram showing a change in a state of a refrigerant in the ejector refrigeration cycle according to the first embodiment.

The subcooled liquid-phase refrigerant that has flowed out of the subcooling portion 12c of the radiator 12 is isentropically reduced in pressure by the nozzle passage 13a, and jetted (from the point b to a point c in FIG. 5). The nozzle passage 13a is defined between an inner peripheral surface of the pressure reducing space 30b of the ejector 13 and an outer peripheral surface of the passage formation member 35. In this situation, a passage cross-sectional area of the pressure reducing space 30b in the smallest passage area portion 30m is regulated so that the degree of superheating of the refrigerant on the outlet side of the evaporator 14 (a point h in FIG. 5) comes closer to a reference degree of superheat KSH.

Further, the refrigerant that has flowed out of the evaporator 14 (the point h in FIG. 5) is drawn through the refrigerant suction port 31b and the suction passage 13b due to the suctioning action of the jet refrigerant which has been jetted from the nozzle passage 13a. The jet refrigerant jetted from the nozzle passage 13a and the suction refrigerant drawn through the suction passage 13b flow into the diffuser passage 13c and join together (from the point c to point d, and from point h1 to point d in FIG. 5).

In this example, the most downstream portion of the suction passage 13b of the present embodiment is formed in a shape whose passage cross-sectional area is gradually reduced toward a refrigerant flowing direction. For that reason, the suction refrigerant to pass through the suction passage 13b increases a flow velocity while reducing the pressure of the suction refrigerant (from the point h to the point h1 in FIG. 5).

In the diffuser passage 13c, a kinetic energy of the refrigerant is converted into a pressure energy by an increase in the refrigerant passage cross-sectional area. As a result, a pressure of the mixture refrigerant rises while the jet refrigerant and the suction refrigerant are mixed together (from the point d to the point e in FIG. 5). The refrigerant that has flowed out of the diffuser passage 13c is separated into gas and liquid in the gas-liquid separation space 30f (from the point e to a point f, and from the point e to point g in FIG. 5).

The liquid-phase refrigerant separated in the gas-liquid separation space 30f flows into the evaporator 14 with a pressure loss when flowing through the refrigerant flow channel extending from the ejector 13 to the evaporator 14 (from a point g to a point g1 in FIG. 5). The refrigerant that has flowed into the evaporator 14 absorbs the heat from the blown air blown by the blower fan 14a, and evaporates (from the point g1 to the point h in FIG. 5). Accordingly, the blown air is cooled.

On the other hand, the gas-phase refrigerant that has been separated in the gas-liquid separation space 30f flows out of the gas-phase refrigerant outflow port 31d, and is drawn into the compressor 11 and compressed again (from the point f to the point a in FIG. 5).

The ejector refrigeration cycle 10 of the present embodiment operates as described above, and can cool the blown air to be blown into the vehicle interior.

In the ejector refrigeration cycle 10 of the present embodiment, the refrigerant that has been increased in pressure by the diffuser passage 13c is drawn into the compressor 11. Therefore, according to the ejector refrigeration cycle 10, a power consumption of the compressor 11 is reduced, and a coefficient of performance (COP) of the cycle can be improved in comparison with a general refrigeration cycle device in which refrigerant evaporation pressure in an evaporator is substantially equal to a pressure of the refrigerant drawn in the compressor.

According to the ejector 13 of the present embodiment, since the drive mechanism 37 is provided, the passage formation member 35 can be displaced according to a load variation of the ejector refrigeration cycle 10 to regulate the passage cross-sectional areas of the nozzle passage 13a and the diffuser passage 13c.

Therefore, the ejector 13 can appropriately operate by changing the passage cross-sectional area of the refrigerant passage (specifically, the nozzle passage 13a and the diffuser passage 13c) internally formed according to the load variation of the ejector refrigeration cycle 10.

As in the ejector 13 of the present embodiment, in the configuration in which the passage formation member 35 is displaced according to the load variation of the ejector refrigeration cycle 10, the center axis CL of the passage formation member 35 may be inclined with respect to the center axes of the inflow space 30a, the pressure reducing space 30b, the pressurizing space 30e, and the like.

If the center axis CL of the passage formation member 35 is inclined, because the passage cross-sectional area of the refrigerant passage having the annular cross section changes in the circumferential direction, there is a risk that a high ejector efficiency cannot be stably exercised.

On the other hand, in the ejector 13 of the present embodiment, the passage formation member 35 and the upstream actuating bar 351a of the shaft 351 are integrated together in such a manner that the center axis CL of the passage formation member 35 and the center axis of the upstream actuating bar 351a are disposed coaxially. As a result, even when the drive mechanism 37 displaces the passage formation member 35 together with the shaft 351, the center axis CL of the passage formation member 35 can be prevented from being inclined.

Further, in the ejector 13 of the present embodiment, since the downstream actuating bar 351b is provided, the passage formation member 35 can be supported at both end sides of the center axis CL. Therefore, the center axis CL of the passage formation member 35 can be more reliably prevented from being inclined. As a result, the ejector efficiency can be prevented from becoming unstable.

Further, in the ejector 13 of the present embodiment, the upstream actuating bar 351a penetrates through the inflow space 30a, and the center axis of the upstream actuating bar 351a and the center axis of the inflow space 30a are disposed coaxially. This makes it difficult for the refrigerant in the inflow space 30a to being swirled around the center axis, and also prevents a gas column from occurring at a center of the inflow space 30a even if the refrigerant is swirled temporarily.

Therefore, there is no case in which the center axis CL of the passage formation member 35 is inclined, and the configuration of the gas column becomes unstable. As a result, the ejector efficiency can be prevented from becoming unstable. Furthermore, since the swirling flow around the center axis is less likely to occur in the refrigerant in the inflow space 30*a*, when the jet refrigerant and the suction refrigerant are mixed together in the mixing passage 13*d*, an increase in the mixing loss caused by a difference in the flow direction between the jet refrigerant and the suction refrigerant can be reduced when the injected refrigerant and the suction refrigerant are mixed together.

Further, in the ejector 13 of the present embodiment, as shown in FIG. 4, the passage cross-sectional area of the mixing passage 13*d* is reduced toward the downstream side in the refrigerant flow. According to the configuration described above, the losses occurring in the mixing passage 13*d* and the diffuser passage 13*c* can be reduced.

The above configuration will be described in more detail. In the ejector 13, the jet refrigerant jetted from the nozzle passage 13*a* to the mixing passage 13*d* tends to have a smaller liquid proportion in the vicinity of the wall due to and inertial force of the droplet, and a flow velocity larger than that in the center of the flow channel. In other words, a flow velocity of the droplet of the jet refrigerant immediately after being jetted from the nozzle passage 13*a* is larger than a two-phase sound speed, and a flow velocity of the gas (that is, the gas-phase refrigerant of the jetted refrigerant) may be larger than a gas sound speed. On the other hand, a flow velocity of the suction refrigerant drawn from the suction passage 13*b* into the mixing passage 13*d* is smaller than the sound speed. That is, the suction refrigerant immediately after being drawn into the mixing passage 13*d* is in a subsonic speed state.

Figure 6:
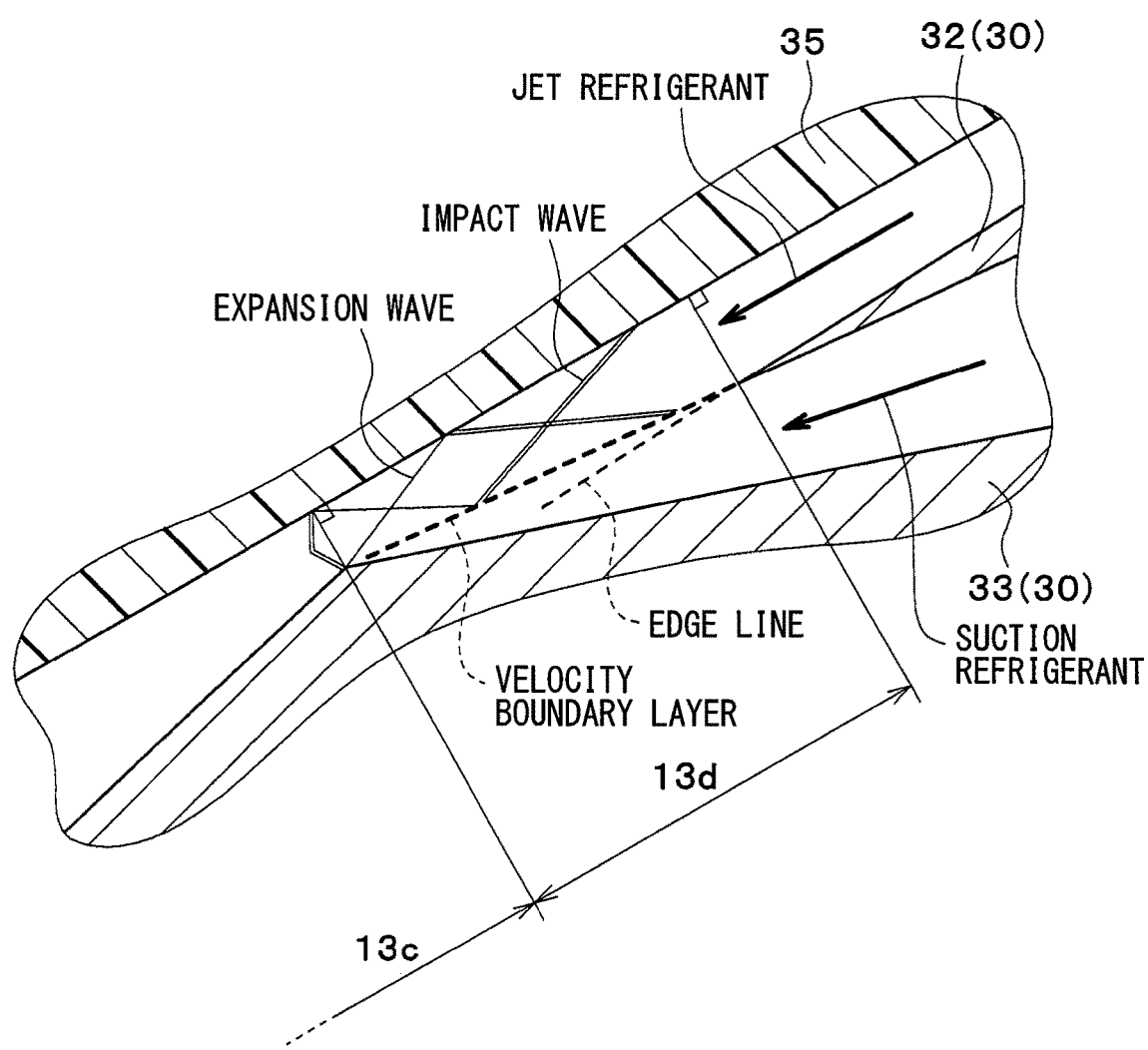
FIG. 6 is a schematic enlarged view of a part VI in FIG. 4.

In that case, a velocity boundary layer is formed between the refrigerant in the supersonic speed state and the refrigerant in the subsonic speed state in the refrigerant in the mixing passage 13*d*, as indicated by a thick broken line in FIG. 6. The flow channel cross-sectional area decreases in the flow direction (that is, a convergent flow) in the mixing passage 13*d*, and the Mach number of the supersonic gas refrigerant decreases. Therefore, an oblique impact wave occurs as indicated a double thin line in FIG. 6. When the Mach number in the wake of the impact wave exceeds 1, an expansion wave as shown by a thin line in FIG. 6 is generated and an impact wave is generated further in the wake of the expansion wave. However, the impact wave is changed into a convergent flow, thereby being capable of shortening an interval between the impact waves, and also capable of reducing the number of occurrences (the impact wave occurs twice in FIG. 6).

Figure 7:
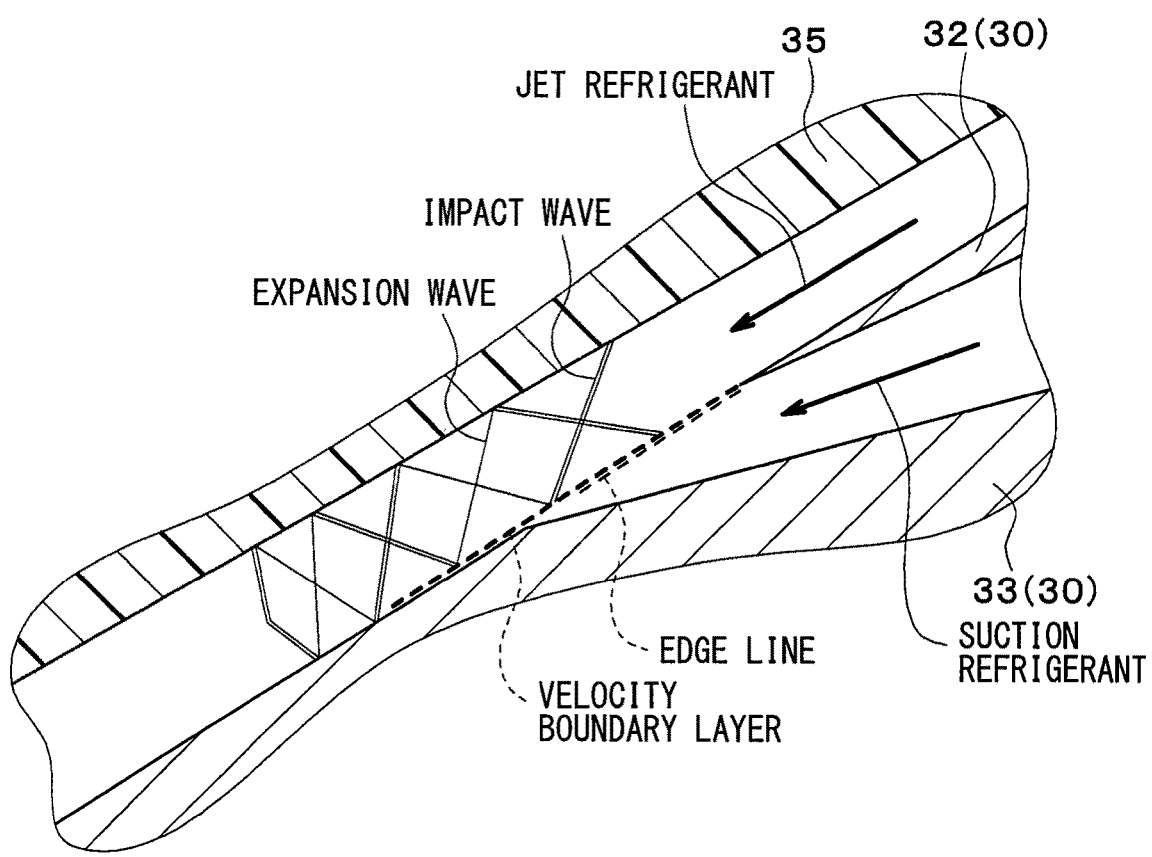
FIG. 7 is a schematic enlarged view of a portion corresponding to FIG. 6 in an ejector of a comparative example.

On the other hand, as shown in FIG. 7, in an ejector of a comparative example in which a refrigerant flow in the mixing passage 13*d* does not become the convergent flow where the passage formation member 35 does not cross an edge line of the outlet side of the nozzle passage 13*a* indicated by a thin broken line, when the number of occurrences of the impact wave is likely to increase (three times in FIG. 7), and the impact wave occurs in an area enlargement section (that is, the diffuser passage 13*c*), the Mach number upstream of the impact wave is equal to or more than 1. As a result, the refrigerant is reduced in pressure and expanded due to an area enlargement, and a pressure rise amount of the ejector is reduced.

The loss (entropy generation amount) of the impact wave will be described with the use of Formula (F1) of the general impact wave entropy generation amount.

[Math 1]

$$\frac{s_2 - s_1}{R} = \frac{\gamma}{\gamma - 1} \ln\left[\frac{(\gamma-1)M_1^2\sin^2\beta + 2}{(\gamma+1)M_1^2\sin^2\beta}\right] + \frac{1}{\gamma - 1} \ln\left[\frac{2\gamma M_1^2\sin^2\beta - (\gamma - 1)}{\gamma + 1}\right] \quad (F1)$$

In Formula (F1), s is an entropy, γ is a specific heat ratio, R is a gas constant, β is an impact wave angle, and M is a Mach number. Subscript 1 indicates a physical quantity before the impact wave before and subscript 2 is a physical quantity after the impact wave.

In this way, the entropy generation amount as a loss against a pressure rise tends to increase as an impact wave angle and the Mach number increase. In addition, the entropy generation amount is increased by the number of occurrences of the impact wave.

Figure 8:
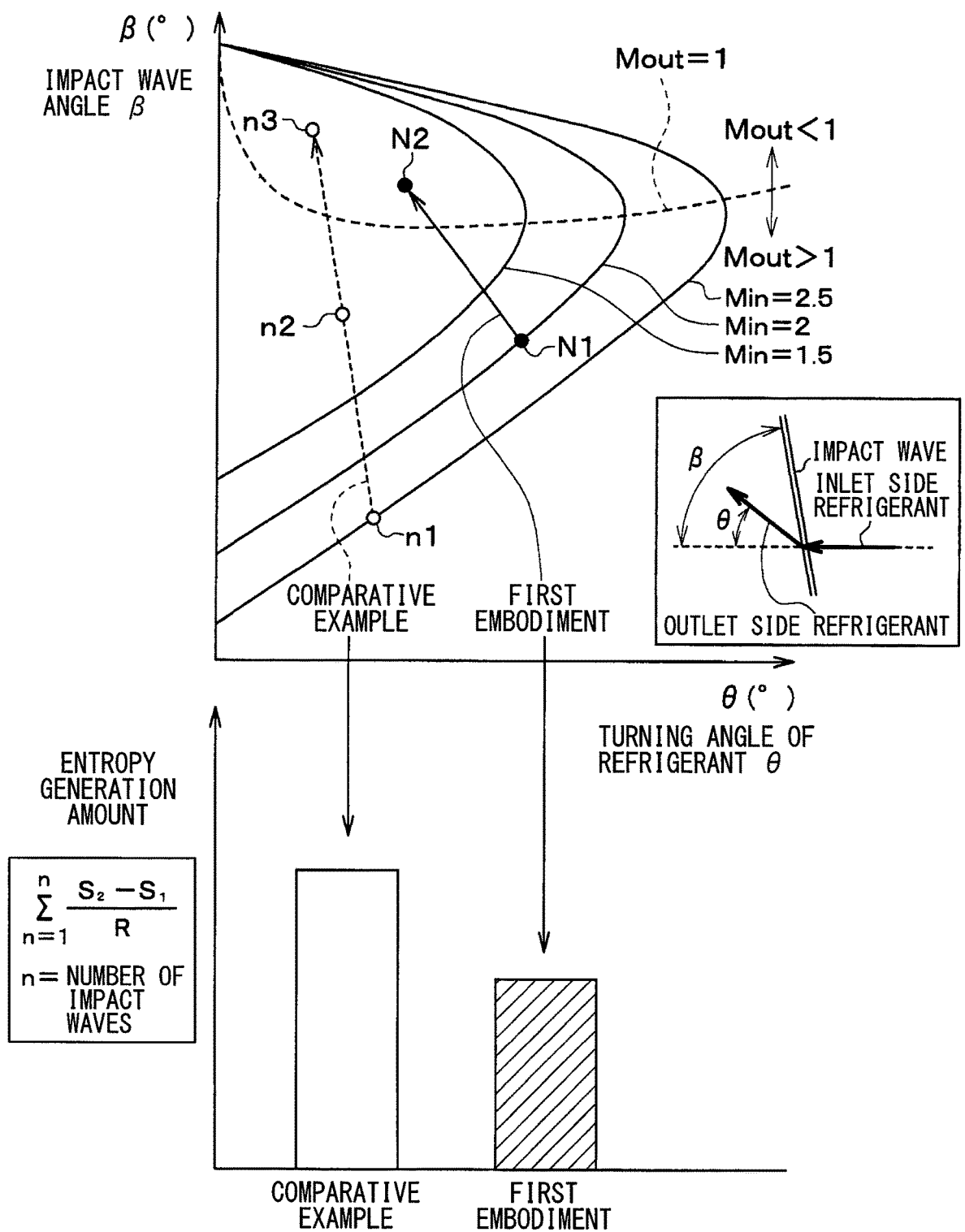
FIG. 8 is an illustrative diagram illustrating characteristics and an entropy generation amount of an impact waves generated when the refrigerant turns a corner.

In the mixing passage 18*d* of the present embodiment, as indicated by a solid arrow in an upper part of FIG. 8, the jet refrigerant transitions to a subsonic speed state while generating impact waves twice in the stated order of N1 and N2. On the other hand, in the comparative example, as indicated by a dashed line arrow in the upper part of FIG. 8, the jet refrigerant transitions to the subsonic speed state while generating the impact waves three times with the Mach number higher than that of the present embodiment in the stated order of n1, n 2, and n3.

Therefore, as indicated in a lower part of FIG. 8, the refrigerant flow in the mixing passage 13*d* is converged so as to decrease the Mach number of the flow as in the present embodiment. As a result, as indicated by the lower part of FIG. 8, the entropy generation amount by the impact waves (an energy loss integrated by repeating the collision) can be reduced, thereby being capable of improving the energy conversion efficiency.

As a result, according to the ejector 13 of the present embodiment, the high energy conversion efficiency can be stably exercised irrespective of a load variation of the applied ejector refrigeration cycle 10. As described above, the fact that an increase in mixing loss can be reduced is extremely effective in the ejector 13 in which the suction refrigerant outlet 13*f* of the suction passage 13*b* opens annularly on the outer peripheral side of the refrigerant ejection port 13*e* of the nozzle passage 13*a*.

Further, in the ejector 13 of the present embodiment, since the center axis of the upstream actuating bar 351*a* and the center axis of the downstream actuating bar 351*b* are disposed coaxially with each other, an assembling property when the passage formation member 35 and the shaft 351 are assembled inside the ejector 13 can be improved.

Further, since the leading end portion of the upstream actuating bar 351*a* is coupled to the plate member 374 of the drive mechanism 37, the coupling can be easily performed as compared with a case in which the passage formation member 35 and the drive mechanism 37 are coupled to each other through the multiple actuating bars.

In the ejector 13 of the present embodiment, when viewed from the direction of the center axis of the inflow space 30*a*, the refrigerant inflow passage 31*e* is provided so that the refrigerant flowing into the inflow space 30*a* flows toward the center axis of the inflow space 30*a*. According to the above configuration, the swirling flow around the center axis can be still more prevented from occurring in the refrigerant in the inflow space 30*a*.

Furthermore, according to the present embodiment, rigid bodies such as the upstream actuating bar 351a and the passage formation member 35 are disposed in the central portions of the inflow space 30a, the pressure reducing space 30b, and the pressurizing space 30e. Accordingly, the axial vertical cross-sectional shapes of all the refrigerant passages defined by the inflow space 30a, the pressure reducing space 30b, and the pressurizing space 30e are annular.

For that reason, since both of a friction with a wall surface of an outer peripheral side wall surface and a friction with the wall surface on the inner peripheral side occur in the refrigerant flowing through those refrigerant passages, the swirling flow is not promoted.

Further, in the ejector 13 of the present embodiment, the smallest passage cross-sectional area of the mixing passage 13d is set to be smaller than a total of the passage cross-sectional area of the refrigerant ejection port 13e and the passage cross-sectional area of the suction refrigerant outlet 13f. According to the above configuration, a mixing property between the jet refrigerant and the mixture refrigerant in the mixing passage 13d can be improved.

In addition, in the ejector 13 of the present embodiment, the passage cross-sectional area of the mixture refrigerant outflow port 31g is set to be smaller than the passage cross-sectional area of the most downstream portion of the diffuser passage 13c. Further, the gas-liquid mixed refrigerant flowing out of the diffuser passage 13c flows along the wall surface of the gas-liquid separation space 30f on the outer peripheral side. According to the above configuration, the pressure loss of the refrigerant generated in the gas-liquid separation space 30f can be reduced.

In more detail, at the mixture refrigerant outflow port 31g, although a static pressure drop of the refrigerant is caused by a reduction in the passage cross-sectional area, the refrigerant flowing into the gas-liquid separation space 30f from the mixture refrigerant outflow port 31g flows along the inner peripheral wall surface of the gas-liquid separation body 313 (in other words, the wall surface of the gas-liquid separation space 30f on the outer peripheral side).

For that reason, since the gas-phase refrigerant flowing into the gas-liquid separation space 30f from the mixture refrigerant outflow port 31g is prevented from being suddenly expanded in volume when flowing into the gas-liquid separation space 30f, the energy loss caused by the volume expansion can be prevented. On the other hand, in the liquid-phase refrigerant flowing into the gas-liquid separation space 30f from the mixture refrigerant outflow port 31g, the energy loss occurs by only the wall surface friction which is relatively little influenced.

Therefore, the kinetic energy of the refrigerant flowing into the gas-liquid separation space 30f having a relatively large volume from the mixture refrigerant outflow port 31g is converted into a pressure energy without being largely lost, and the static pressure of the refrigerant is recovered. As a result, the pressure loss of the refrigerant generated in the gas-liquid separation space 30f can be reduced.

Further, a pressure difference between the pressure in the gas-liquid separation space 30f and the pressure in the compressor 11 on the intake port side can be secured due to the pressure recovery. As a result, a refrigerator oil dissolved in the liquid-phase refrigerant can be surely returned to the intake port side of the compressor 11 through the oil return hole 313b.

Second Embodiment

Figure 9:
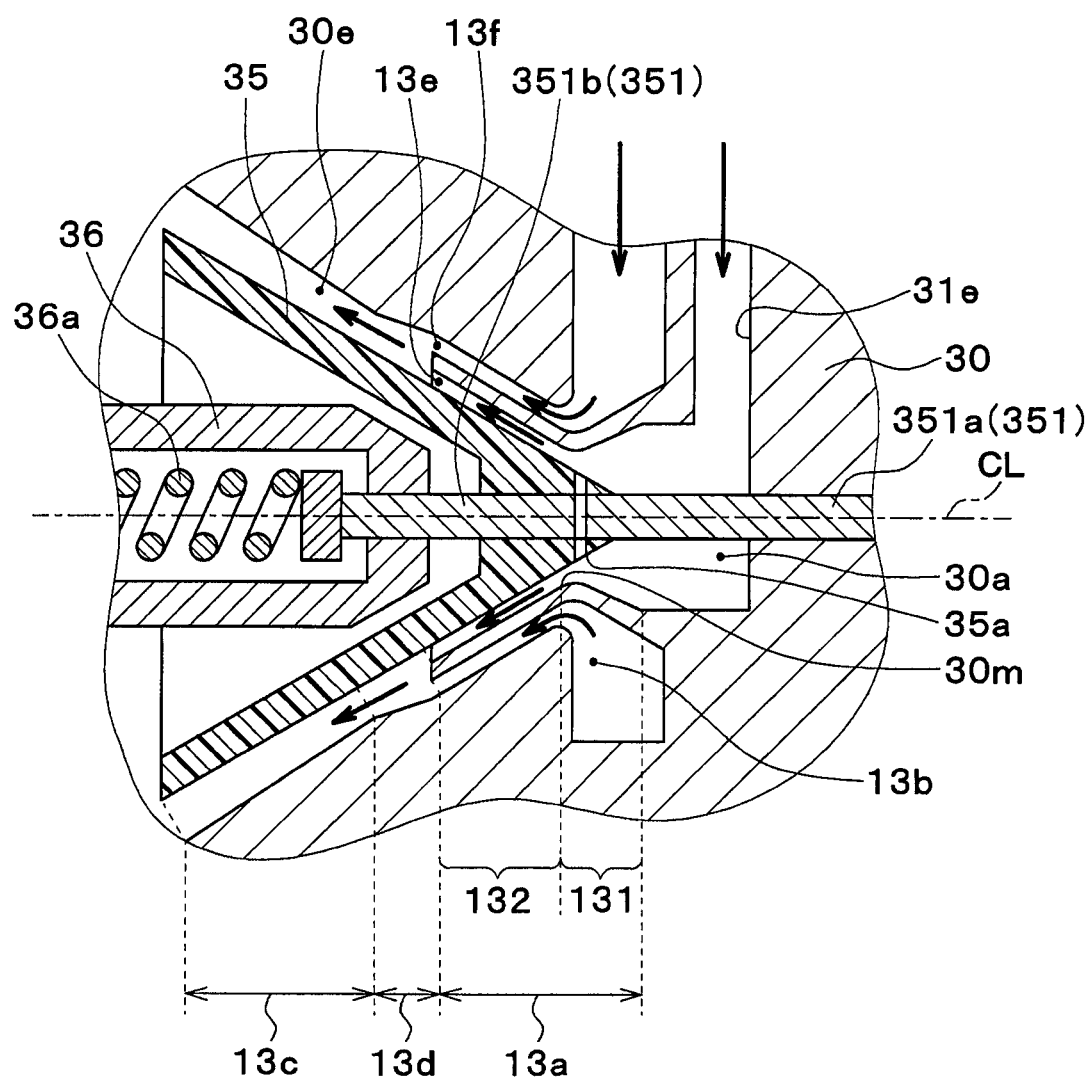
FIG. 9 is a schematic cross-sectional view of a part of an ejector according to a second embodiment.

In the present embodiment, an example in which as shown in an enlarged cross-sectional view of FIG. 9, as compared with the ejector 13 of the first embodiment, a recess portion is provided on a top side of the passage formation member 35, and the dent portion is dented toward a side where a passage cross-sectional area of a nozzle passage 13a will be described. FIG. 9 is a diagram corresponding to FIG. 4 in the first embodiment. In FIG. 9, identical portions with or equivalent portions to those in the first embodiment are denoted by the same reference numerals. The same is applied to the following drawings.

Specifically, the recess portion of the present embodiment is configured by a through hole 35a provided on the top side of the passage formation member 35 and penetrates through a conical lateral surface of the passage formation member 35 in a direction perpendicular to a center axis CL. The through hole 35a is provided so as to be positioned on an upstream side of a smallest passage area portion 30m of a nozzle passage 13a in a refrigerant flow.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

Furthermore, since the passage formation member 35 of the ejector 13 according to the present embodiment is provided with the through hole 35a, boiling nucleus can be generated by rapidly enlarging a refrigerant passage cross-sectional area of the nozzle passage 13a. Accordingly, the boiling of the refrigerant in the nozzle passage 13a is promoted, thereby being capable of improving an energy conversion efficiency in the nozzle passage 13a.

Further, in the ejector 13 of the present embodiment, since the through hole 35a is provided, a pressure distribution of the nozzle passage 13a formed in an annular sectional shape in a circumferential direction can be reduced. Therefore, even if the center axis CL of the passage formation member 35 is inclined, the ejector efficiency can be prevented from being significantly lowered. Further, the number of through holes 35a is not limited to one, but multiple through holes 35a may be provided in the circumferential direction and may be disposed at regular angular intervals.

Third Embodiment

Figure 10:
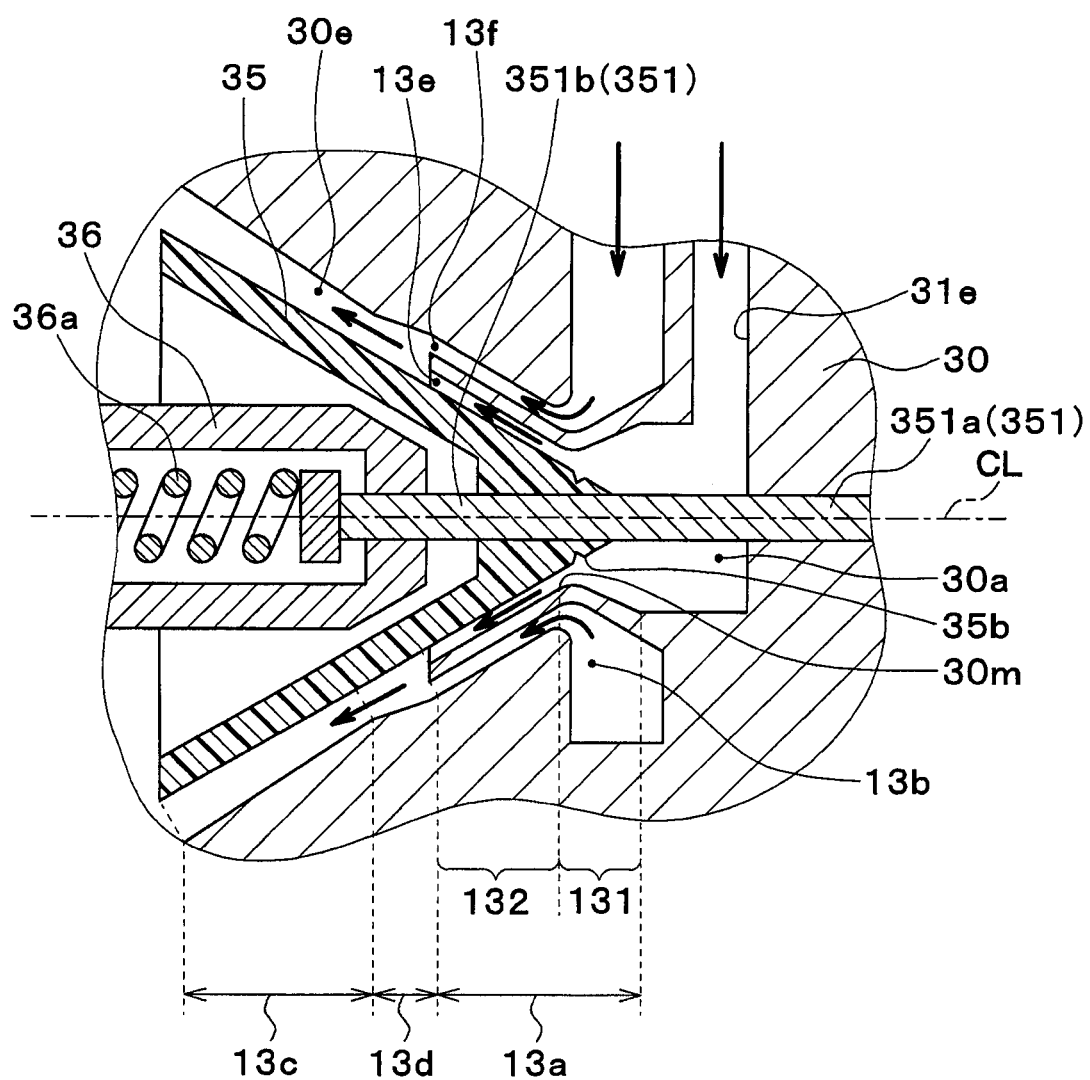
FIG. 10 is a schematic cross-sectional view of a part of an ejector according to a third embodiment.

In the present embodiment, an example in which as shown in an enlarged cross-sectional view of FIG. 10, as compared with the ejector 13 of the first embodiment, a recess portion is provided on a top side of the passage formation member 35, and the dent portion is dented toward a side where a passage cross-sectional area of a nozzle passage 13a will be described. FIG. 10 is a diagram corresponding to FIG. 4 in the first embodiment.

Specifically, the recess portion of the present embodiment is configured by a groove portion 35b provided on the top side of the passage formation member 35 and provided over an entire circumference of the passage formation member 35 around a center axis CL of the passage formation member 35. The groove portion 35b is provided so as to be positioned on an upstream side of a smallest passage area portion 30m of a nozzle passage 13a in a refrigerant flow.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

Furthermore, since the passage formation member 35 of the ejector 13 according to the present embodiment is provided with the groove portion 35b, boiling nucleus can be generated by rapidly enlarging a refrigerant passage cross-sectional area of the nozzle passage 13a. Accordingly, the boiling of the refrigerant in the nozzle passage 13a is promoted, thereby being capable of improving an energy conversion efficiency in the nozzle passage 13a.

Further, in the ejector 13 of the present embodiment, since the groove portion 35b is provided, even if the center axis CL of the passage formation member 35 is inclined, the generation amount of boiling nucleus is adjusted according to the inclination. As a result, similarly to the second embodiment, a pressure distribution of the nozzle passage 13a formed in an annular sectional shape in the circumferential direction can be reduced.

In the ejector 13 of the present embodiment, the groove portion 35b is provided over the entire circumference of the passage formation member 35 around the center axis, but a shape of the groove portion 35b is not limited to the above example. Multiple annular groove portions may be provided over the entire circumference around the center axis, or the multiple grooves may be discontinuously provided in an annular shape around the center axis of the passage formation member 35.

Fourth Embodiment

Figure 11:
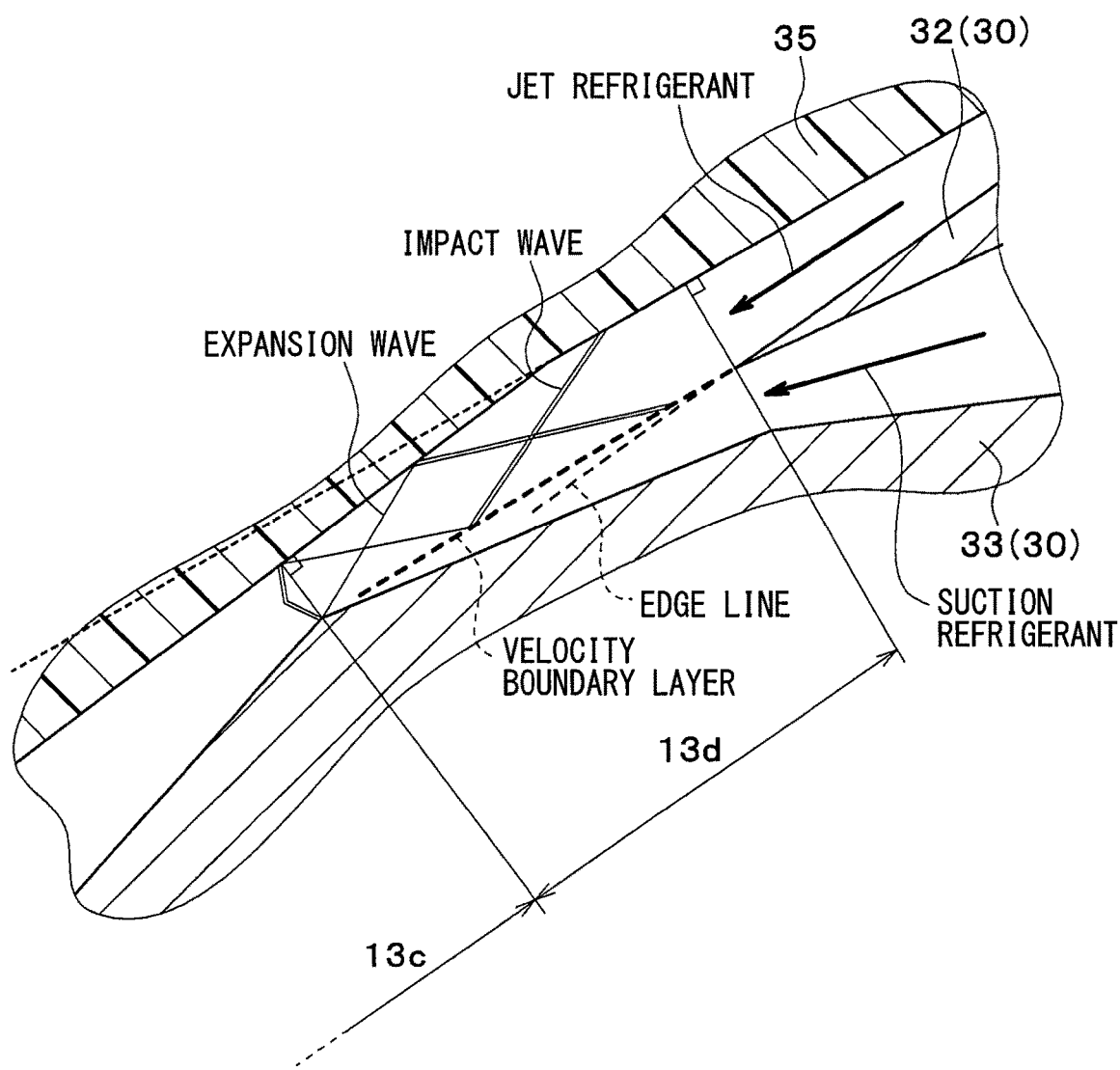
FIG. 11 is a schematic cross-sectional view showing a mixing passage of an ejector according to a fourth embodiment.

In the present embodiment, as illustrated in FIG. 11, an example in which a shape of a mixing passage 13d is changed as compared with the ejector 13 in the first embodiment will be described.

More specifically, as shown in FIG. 4, an outline of a wall surface defining the mixing passage 13d in the passage formation member 35 according to the present embodiment on a cross-sectional plane including the center axis CL is inclined to come closer to the diffuser body 33 in a downstream direction of the refrigerant flow. As a result, the passage cross-sectional area of the mixing passage 13d is reduced toward the downstream side in the refrigerant flow.

FIG. 11 is a schematically enlarged cross-sectional view corresponding to FIG. 6 described in the first embodiment. In addition, in FIG. 11, for clarification of the description, a cross-sectional shape corresponding to the conical lateral surface of the passage formation member 35 of the first embodiment is indicated by a thin broken line.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

In other words, in the present embodiment, the conical lateral surface of the passage formation member 35 is inclined so that the passage cross-sectional area of the mixing passage 13d is reduced toward the downstream side of the mixing passage 13d in the refrigerant flow. Even if the mixing passage 13d is provided in the above manner, as in the first embodiment, the pressure increase performance of the diffuser passage 13c is stabilized so that the ejector efficiency can be prevented from becoming unstable, and also the mixing loss occurring when the jet refrigerant and the suction refrigerant are mixed together can be reduced.

Fifth Embodiment

Figure 12:
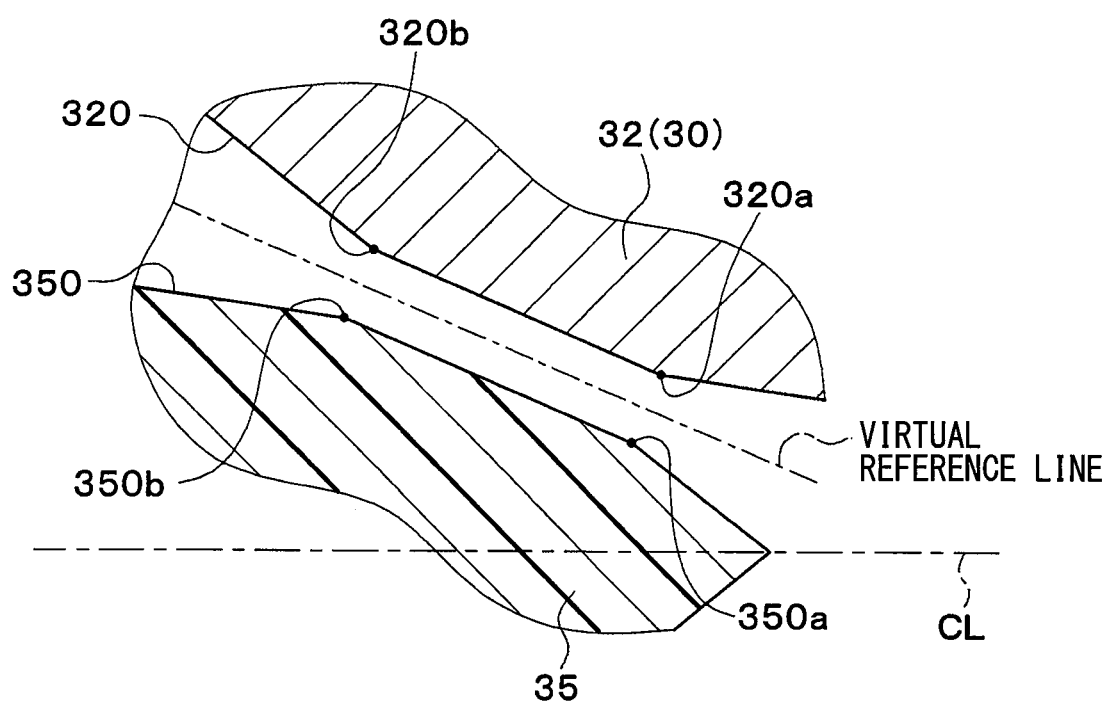
FIG. 12 is a schematic cross-sectional view showing a nozzle passage of an ejector according to a fifth embodiment.

In the present embodiment, as illustrated in FIG. 12, an example in which a shape of a passage formation member 35 and so on is changed as compared with the ejector 13 of the first embodiment will be described. FIG. 12 is an enlarged cross-sectional view of an ejector 13 according to the present embodiment, which is a schematic enlarged cross-sectional view of a portion corresponding to a part XII in FIG. 4 described in the first embodiment.

Specifically, in the ejector 13 of the present embodiment, an outline (hereinafter referred to as an inner line) 350 of a wall surface providing a nozzle passage 13a in a passage formation member 35 on a cross-sectional plane including a center axis CL includes a shape pointed toward the nozzle passage 13a, for example, a shape sharpened toward the nozzle passage. In more detail, the inner line 350 is shaped by combining multiple straight lines or curves together, and forms corners 350a and 350b that are convex toward the nozzle passage 13a.

Also, in the ejector 13 of the present embodiment, an outline (hereinafter referred to as an outer line) 320 of a wall surface providing the nozzle passage 13a in the nozzle 32 on the cross-sectional plane including the center axis CL includes a shape pointed toward the nozzle passage 13a. In more detail, the outer line 320 is shaped by combining multiple straight lines or curves together, and forms corners 320a and 320b that are convex toward the nozzle passage 13a.

Further, the inner line 350 and the outer line 320 are provided to be axisymmetric with respect to a virtual reference line virtually defined in a cross section including the center axis CL.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

Furthermore, since the passage formation member 35 of the ejector 13 according to the present embodiment is provided with the corners 350a and 350b, a flow direction of the refrigerant flowing through the nozzle passage 13a is turned, thereby being capable of generating boiling nucleus on the center axis side of the nozzle passage 13a. In other words, boiling of the refrigerant in the nozzle passage 13a can be promoted with the corners 350a and 350b as boiling starting points.

Likewise, since the nozzle 32 is provided with the corners 320a and 320b, a flow direction of the refrigerant flowing through the nozzle passage 13a is turned, thereby being capable of generating boiling nucleus on the outer peripheral side of the nozzle passage 13a. In other words, boiling of the refrigerant in the nozzle passage 13a can be promoted with the corners 320a and 320b as the boiling starting points.

Further, in the present embodiment, since the inner line and the outer line are provided so as to be axisymmetric with respect to the reference line, the boiling nucleus can be supplied to the refrigerant flowing through the nozzle passage 13a from both of the inner peripheral side and the outer peripheral side at the same time. Therefore, the boiling nucleus is easily uniformly supplied to the refrigerant flowing through the nozzle passage 13a.

Accordingly, the boiling of the refrigerant in the nozzle passage 13a is effectively promoted, thereby being capable of more improving an energy conversion efficiency in the nozzle passage 13a.

Sixth Embodiment

Figure 13:
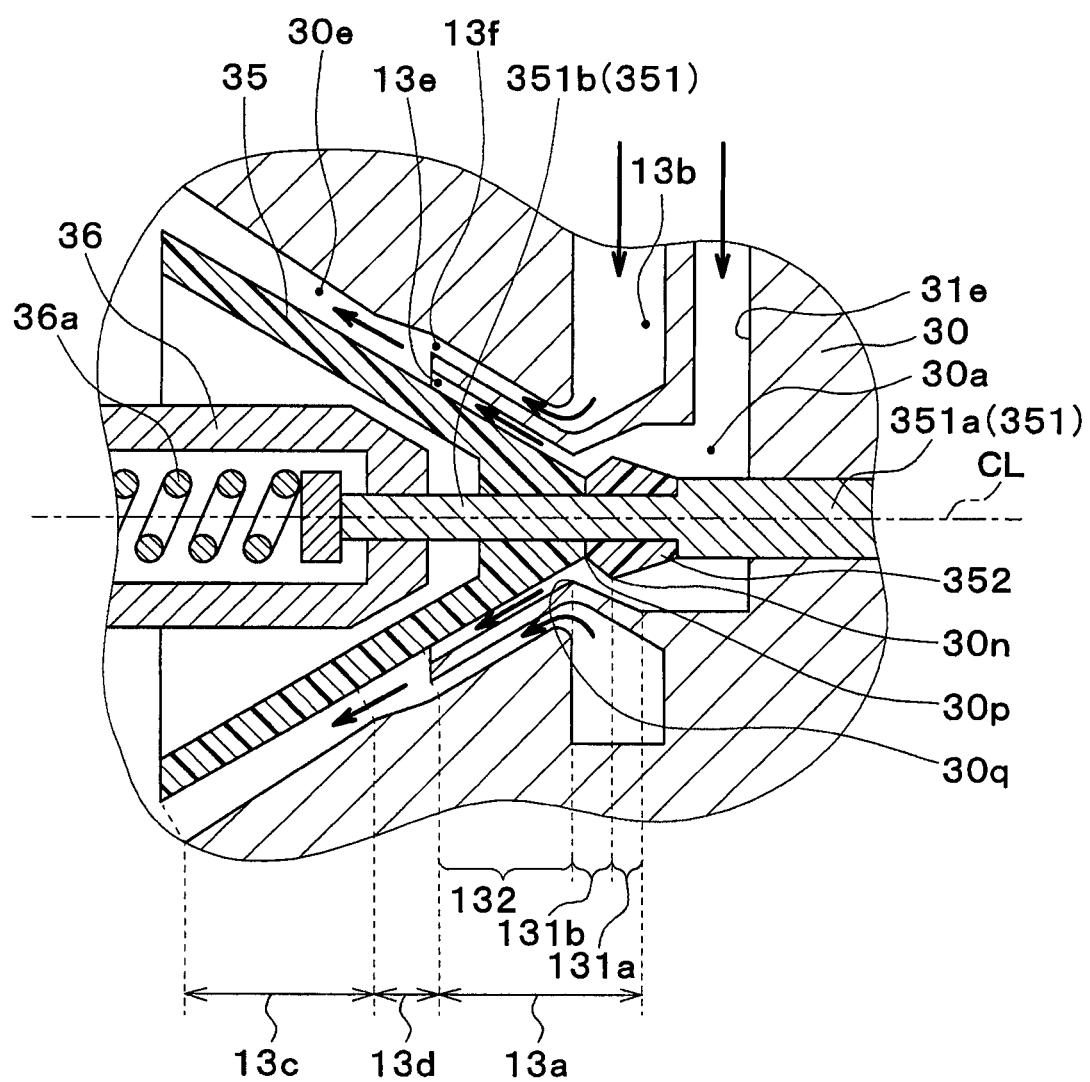
FIG. 13 is a schematic cross-sectional view of a part of an ejector according to a sixth embodiment.

In the present embodiment, as shown in FIG. 13, an example in which an annular member 352 is disposed on a top side of a passage formation member 35 in the ejector 13 of the first embodiment will be described. FIG. 13 is a schematically enlarged cross-sectional view corresponding to FIG. 4 described in the first embodiment. Further, in the present embodiment, a portion having the smallest inner diameter in a portion forming a nozzle passage 13a of a nozzle 32 is defined as a smallest inner diameter portion 30q.

Specifically, the annular member 352 is an annular member made of the same material as that of the passage formation member 35. An outer shape of the annular member 352 is formed in a shape of a rotating body in which bottom surfaces of two truncated cones are coupled to each other.

The annular member 352 is shaped to have a largest outer diameter portion 30n at a substantially central portion in the center axis direction and have a smallest outer diameter portion 30p at a most downstream portion in the refrigerant flow. In the present embodiment, the annular member 352 and the passage formation member 35 are formed as separate members. However, if the passage formation member 35 and the like can be assembled in the body 30, the annular member 352 and the passage formation member 35 may be formed integrally with each other.

Next, the nozzle passage 13a of the present embodiment will be described. The annular member 352 is disposed on the top side of the passage formation member 35. For that reason, as shown in FIG. 13, a wall surface of the nozzle passage 13a on a side of the center axis CL (that is, the passage formation member 35 and the annular member 352 side) has a shape on an axial cross-sectional plane to be separated from the center axis CL toward the downstream side in the refrigerant flow in a range extending from the upstream side of the annular member 352 toward the largest outer diameter portion 30n.

Further, the shape comes closer to the center axis CL toward the downstream side in the refrigerant flow in a range extending from the largest outer diameter portion 30n toward the smallest outer diameter portion 30p. The shape is separated from the center axis CL from the smallest outer diameter portion 30p toward the downstream side in the refrigerant flow.

On the other hand, as shown in FIG. 13, a wall surface of the nozzle passage 13a on a side opposite to the center axis CL (that is, a side of a portion providing the pressure reducing space 30b in the nozzle 32) has a shape in the axial cross-sectional plane to come closer to the center axis CL toward the downstream side in the refrigerant flow in a range extending from the inflow space 30a side toward the smallest inner diameter portion 30q. Further, the shape is separated from the center axis CL from the smallest inner diameter portion 30q toward the downstream side in the refrigerant flow.

For that reason, as shown in FIG. 13, the convergent portion 131 of the nozzle passage 13a according to the present embodiment is roughly divided into a first convergent portion 131a and a second convergent portion 131b.

The first convergent portion 131a is a refrigerant passage that is provided in a range from the upstream side of the annular member 352 in the refrigerant flow to the largest outer diameter portion 30n, in which the passage cross-sectional area gradually decreases. The second convergent portion 131b is a refrigerant passage that is provided in a range from the largest outer diameter portion 30n of the annular member 352 to the smallest inner diameter portion 30q of the nozzle 32, and is reduced after the passage cross-sectional area immediately after the first convergent portion 131a has been enlarged.

In other words, the present embodiment forms a throat portion in which the passage cross-sectional area of the nozzle passage 13a is gradually reduced toward the downstream side in the refrigerant flow by the largest outer diameter portion 30n of the annular member 352 and the smallest inner diameter portion 30q of the nozzle 32, and then a flow direction of at least a part of the refrigerant is suddenly turned.

Further, the largest outer diameter portion 30n of the annular member 352 is a most upstream throat portion that is disposed on the most upstream side in the refrigerant flow. With the formation of the largest outer diameter portion 30n, the nozzle passage 13a is shaped to enlarge the passage cross-sectional area toward the center axis CL side. Further, the largest outer diameter portion 30n is disposed in a region of the nozzle passage 13a through which the refrigerant in the subsonic speed state flows.

On the other hand, the smallest inner diameter portion 30q of the nozzle 32 is a downstream side throat portion that is disposed on the downstream side of the most upstream throat portion in the refrigerant flow. The smallest inner diameter portion 30q is formed in a shape enlarging the passage cross-sectional area of the nozzle passage 13a toward a side away from the center axis CL of the passage formation member 35.

In other words, the nozzle passage 13a of the present embodiment changes the passage cross-sectional area so as to function as a two-stage throttle type Laval nozzle having multiple (two in the present embodiment) throat portions (throat portions). Further, in the nozzle passage 13a, the refrigerant is reduced in pressure, accelerated so that a flow rate of the refrigerant reaches a supersonic speed, and jetted.

Further, in the nozzle passage 13a of the present embodiment, the dimensions of the annular member 352 and the nozzle 32 are set so that the smallest passage cross-sectional area of the refrigerant passage provided by the most upstream throat portion (that is, the largest outer diameter portion 30n of the annular member 352) is smaller than the smallest passage cross-sectional area of the refrigerant passage provided by the downstream side throat portion (in other words, the smallest inner diameter portion 30q of the nozzle 32).

For that reason, when the drive mechanism 37 displaces the passage formation member 35 to close the nozzle passage 13a, the largest outer diameter portion 30n of the annular member 352 comes into contact with the nozzle 32.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

In other words, in the ejector 13 of the present embodiment, the largest outer diameter portion 30n of the annular member 352 configuring the most upstream throat portion is formed in the region of the nozzle passage 13a through which the refrigerant in the subsonic speed state flows, and the largest outer diameter portion 30n functions as an edge that rapidly enlarges the passage cross-sectional area of the nozzle passage 13a to generate a separation vortex. Accordingly, boiling nuclei can be generated in the liquid-phase refrigerant flowing through the nozzle passage 13a.

Further, the largest outer diameter portion 30n of the annular member 352 configuring the most upstream throat portion is formed on the passage formation member 35 side (that is, on the center axis CL side). At least a part of the nozzle passage 13a is formed in a shape that allows the flow direction of the refrigerant to be turned toward the center axis CL of the passage formation member 35.

According to the above configuration, the boiling nucleus can be supplied from the center axis CL side to the liquid-phase refrigerant flowing through the nozzle passage 13a. Therefore, even if no gas column or the like is generated in the refrigerant in the inflow space 30a, the boiling of the refrigerant flowing through the nozzle passage 13a can be promoted, and the ejector efficiency can be improved.

In addition, in the ejector 13 of the present embodiment, the smallest inner diameter portion 30q of the nozzle 32 configuring the downstream side throat portion is formed in a portion forming the pressure reducing space 30b of the nozzle 32. At least a part of the nozzle passage 13a is formed in a shape so as to turn the flow direction of the refrigerant to a side separated from the center axis CL of the passage formation member 35.

According to the above configuration, the boiling nucleus can be also supplied from the outer peripheral side to the liquid-phase refrigerant flowing through the nozzle passage 13a. Therefore, the boiling of the refrigerant flowing through the nozzle passage 13a can be further promoted.

In the ejector 13 of the present embodiment, the smallest passage cross-sectional area of the refrigerant passage provided by the largest outer diameter portion 30n of the annular member 352 is smaller than the smallest passage cross-sectional area of the refrigerant passage provided by the smallest inner diameter portion 30q of the nozzle 32.

Accordingly, the flow rate of the refrigerant flowing through the nozzle passage 13a can be adjusted by changing the passage cross-sectional area of the refrigerant passage provided by the largest outer diameter portion 30n. Further, a subsonic refrigerant flows through the refrigerant passage provided by the largest outer diameter portion 30n, and the refrigerant puts into a supersonic critical state on the downstream side of the largest outer diameter portion 30n. Therefore, the refrigerant flow rate can be adjusted with high precision in the refrigerant passage provided by the largest outer diameter portion 30n.

Seventh Embodiment

Figure 14:
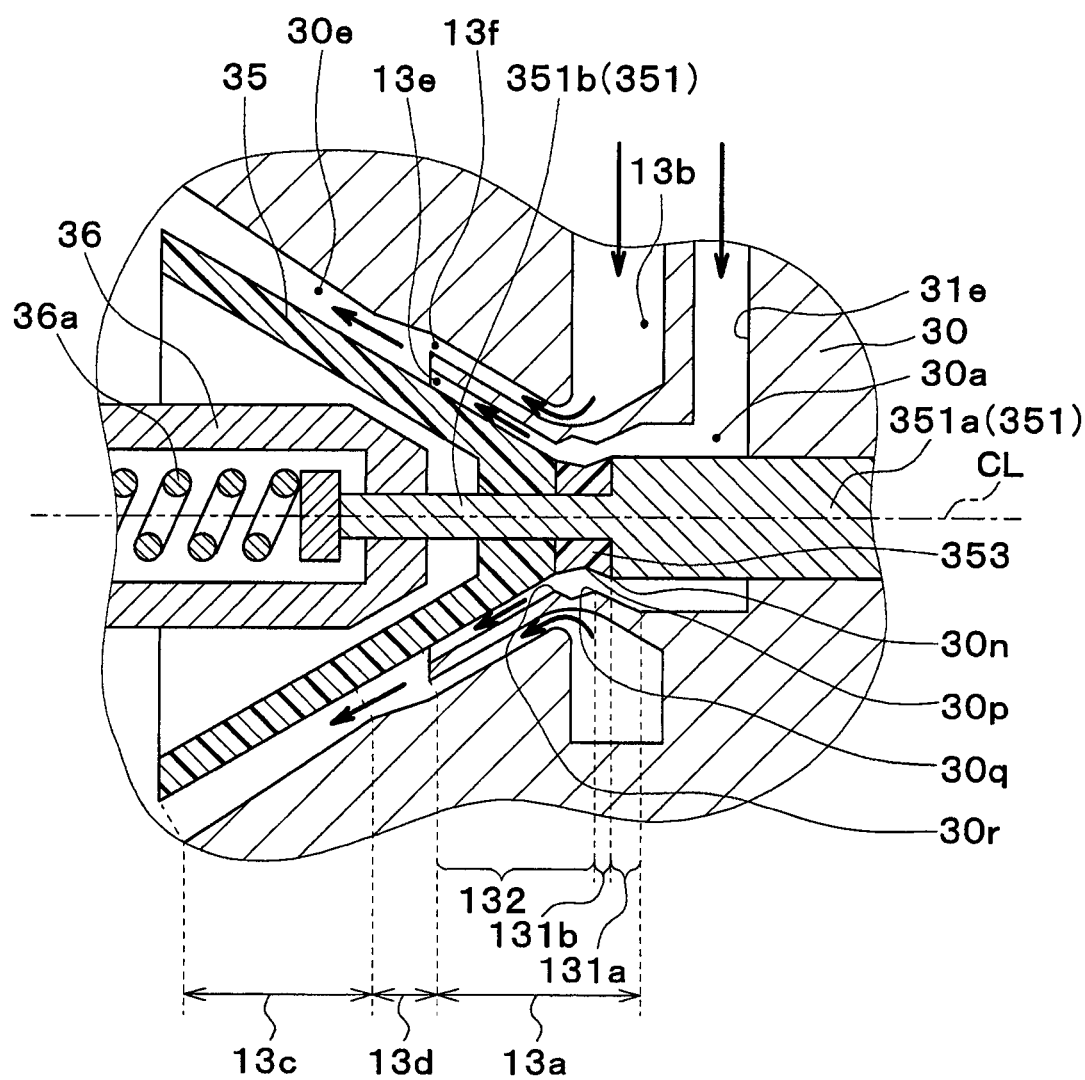
FIG. 14 is a schematic cross-sectional view of a part of an ejector according to a seventh embodiment.

In the present embodiment, an example in which as shown in an enlarged cross-sectional view of FIG. 14, as compared with the ejector 13 of the sixth embodiment, a shape of an annular member 353 of a passage formation member 35 on a top side and a shape of a portion forming a pressure reducing space 30b of a nozzle 32 are changed will be described. FIG. 14 is a diagram corresponding to FIG. 13 described in the sixth embodiment.

In more detail, an outer shape of the annular member 353 according to the present embodiment is formed in a shape of a rotating body in which top sides of two truncated cones are coupled to each other. Therefore, the annular member 353 according to the present embodiment is shaped to have a largest outer diameter portion 30n at a most upstream side in a refrigerant flow, and have a smallest outer diameter portion 30p at a substantially central portion in the center axis direction. Further, an outer diameter of an upstream actuating bar 351a of a shaft 351 according to the present embodiment is equal to that of the largest outer diameter portion 30n.

Therefore, as shown in FIG. 6, an axial cross-sectional shape of a nozzle passage 13a by a wall surface of the nozzle passage 13a on a side of a center axis CL (the passage formation member 35 and the annular member 353 side) comes closer to the center axis CL toward the downstream side in the refrigerant flow in a range extending from the largest outer diameter portion 30n of the annular member 353 on the most upstream side toward the smallest outer diameter portion 30p. The shape is separated from the center axis CL from the smallest inner diameter portion 30o toward the downstream side in the refrigerant flow.

On the other hand, a portion of the nozzle 32 for providing the pressure reducing space 30b according to the present embodiment has two diameter reduction portions of an upstream side smallest inner diameter portion 30q and a downstream side smallest inner diameter portion 30r. An inner diameter of the upstream side smallest inner diameter portion 30q is smaller than an inner diameter of the downstream side smallest inner diameter portion 30r.

Therefore, as shown in FIG. 14, an axial cross-sectional shape of the nozzle passage 13a on an opposite side of the center axis CL (a side of a portion of the nozzle 32 for providing pressure reducing space 30b) comes closer to the center axis CL toward the downstream side in the refrigerant flow in a range extending from the inflow space 30a side toward the upstream side smallest inner diameter portion 30q. In the range from the upstream side smallest inner diameter portion 30q to the downstream side smallest inner diameter portion 30r, the shape comes closer to the downstream side in the refrigerant flow after having been separated from the center axis CL. The shape is separated from the center axis CL from the downstream side smallest inner diameter portion 30r toward the downstream side in the refrigerant flow.

In addition, according to the present embodiment, the second convergent portion 131b is formed in a shape gradually reduced in the passage cross-sectional area toward the downstream side in the refrigerant flow. Furthermore, the divergent portion 132 of the present embodiment is formed with two throat portions are formed, that is, an upstream side smallest inner diameter portion 30q and a downstream side smallest inner diameter portion 30r. In other words, according to the present embodiment, two downstream side throat portions are disposed on the downstream side of the most upstream throat portion in the refrigerant flow.

In other words, the nozzle passage 13a of the present embodiment changes the passage cross-sectional area so as to function as a multistage throttle type nozzle having multiple throat portions (throat portions). The other configurations of the ejector 13 and the ejector refrigeration cycle 10 are identical with those in the first embodiment.

Also, in the nozzle passage 13a of the ejector 13 according to the present embodiment, a pressure of the refrigerant is reduced in multiple stages. That is, in the first convergent portion 131a of the present embodiment, the liquid-phase refrigerant in a subsonic speed state is reduced in pressure. The second convergent portion 131b according to the present embodiment is formed into a convergent shape gradually reduced in the passage cross-sectional area toward the downstream side in the refrigerant flow. For that reason, in the second convergent portion 131b, the refrigerant is reduced in pressure and accelerated while being kept in the subsonic state.

The largest outer diameter portion 30n of the annular member 353 forming the most upstream portion of the second convergent portion 131b serves as an edge so that a separation vortex occurs in the refrigerant flowing into the second convergent portion 131b, and a boiling nucleus is generated in the refrigerant on the center axis CL side. The upstream side smallest inner diameter portion 30q of the nozzle 32 forming the most upstream portion of the divergent portion 132 serves as an edge so that a separation vortex occurs in the refrigerant flowing into the divergent portion 132, and a boiling nucleus is generated in the refrigerant on the outer peripheral side.

Choking (choking) occurs in the boil promoted refrigerant in the vicinity of the upstream side smallest inner diameter portion 30q. The refrigerant reaches sound speed by the choking. Furthermore, since the downstream side smallest inner diameter portion 30r serves as an edge and the boiling nucleus is generated, the boiling of the refrigerant is further promoted and the refrigerant is jetted from the refrigerant ejection port 13e.

The other configuration and operation of the ejector 13 and the ejector refrigeration cycle 10 are the same as those of the first embodiment. Therefore, the ejector 13 and the ejector refrigeration cycle 10 according to the present embodiment can obtain the same advantages as those in the sixth embodiment. In other words, the number of throat portions is not limited to two as in the sixth embodiment, and three or more throat portions may be provided as in the present embodiment.

Eighth Embodiment

Figure 15:
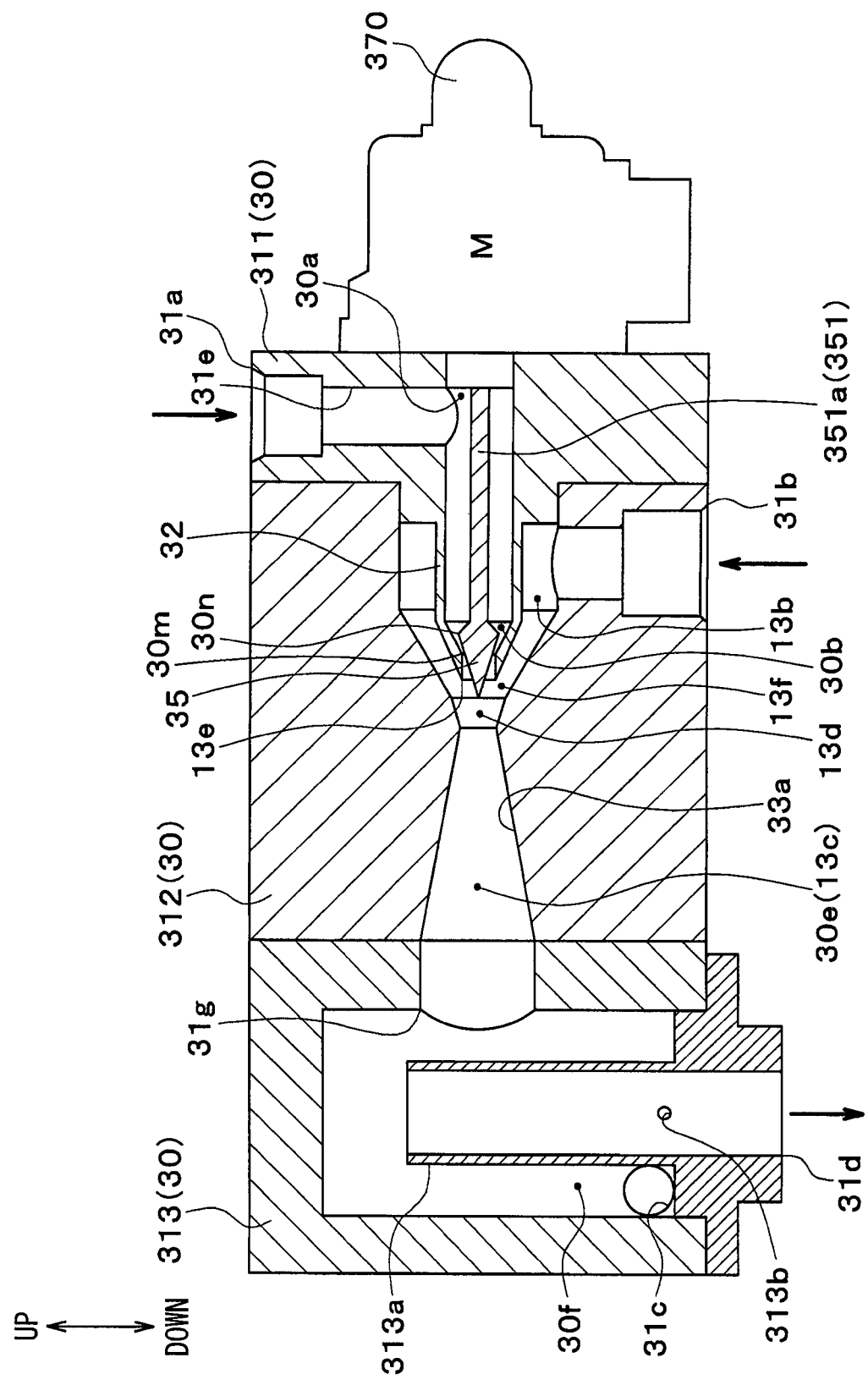
FIG. 15 is a cross-sectional view of an ejector according to an eighth embodiment.

In the present embodiment, as illustrated in FIG. 15, an example in which a configuration of an ejector 13 is simplified as compared with the ejector 13 in the first embodiment will be described. FIG. 15 is an axial cross-sectional view corresponding to FIG. 2 described in the first embodiment.

In the ejector 13 of the present embodiment, a shape of a passage formation member 35 is changed as compared with the first embodiment.

The passage formation member 35 according to the present embodiment is shaped such that a cross-sectional area perpendicular to a center axis is enlarged from an upstream side in a refrigerant flow toward a downstream side, and thereafter reduced. In more detail, an outer shape of the passage formation member 35 according to the present embodiment is formed in a shape of a rotating body in which bottom surfaces of a truncated conical member and a conical member are coupled to each other.

For that reason, a largest outer diameter portion 30n is formed in a substantially central portion of the passage formation member 35 in the center axis direction. The largest outer diameter portion 30n functions as a most upstream throat portion described in the sixth embodiment. At least a part of the passage formation member 35 is disposed inside a pressure reducing space 30b defined in a nozzle 32.

The nozzle 32 of the present embodiment is formed integrally with an upper body 311. The nozzle 32 is formed with a smallest passage area portion 30m that minimizes a passage cross-sectional area of a nozzle passage 13a. The smallest passage area portion 30m functions as the downstream side throat portion described in the sixth embodiment.

The largest outer diameter portion 30n of the passage formation member 35 is positioned on the upstream side of the smallest passage area portion 30m in the refrigerant flow. The nozzle passage 13a defined between an outer peripheral surface of the passage formation member 35 and an inner peripheral surface of a portion of the nozzle 32 for providing the pressure reducing space 30b is changed in the passage cross-sectional area in the same manner as that of the Laval nozzle as in the first embodiment.

In other words, a portion of the nozzle passage 13a which is formed on the refrigerant flow upstream side of the smallest passage area portion 30m where the passage cross-sectional area is most reduced is a convergent portion whose passage cross-sectional area is gradually reduced toward the downstream side in the refrigerant flow. A portion of the nozzle passage 13a which is formed on the refrigerant flow downstream side of the smallest passage area portion 30m becomes a divergent portion whose passage cross-sectional area gradually increases toward the downstream side in the refrigerant flow.

An upstream actuating bar 351a of a shaft 351 is integrally and coaxially coupled to a top side of the truncated conical portion disposed on the upstream side of the largest outer diameter portion 30n in the refrigerant flow. The upstream actuating bar 351a is coupled with a stepping motor 370. The stepping motor 370 is a drive mechanism for displacing the passage formation member 35. The operation of the stepping motor 370 is controlled according to a control signal (control pulse) output from a control device.

An outer diameter of the largest outer diameter portion 30n of the passage formation member 35 is set to be larger than an inner diameter of the smallest passage area portion 30m of the nozzle 32. For that reason, when the stepping motor 370 displaces the passage formation member 35 to close the nozzle passage 13a, the largest outer diameter portion 30n of the passage formation member 35 comes into contact with the nozzle 32.

The passage cross-sectional area of a mixing passage 13d disposed on the downstream side of the nozzle passage 13a in the refrigerant flow is reduced toward the downstream side in the refrigerant flow. Furthermore, a smallest passage cross-sectional area of the mixing passage 13d is set to be smaller than a total of a passage cross-sectional area of the refrigerant ejection port 13e and a passage cross-sectional area of the suction refrigerant outlet 13f.

In addition, although at least a part of the passage formation member 35 according to the present embodiment is disposed in the pressure reducing space 30b, the passage formation member 35 is not disposed in the pressurizing space 30e. Therefore, in the ejector 13 of the present embodiment, as shown in FIG. 15, the pressurizing space 30e is shaped such that the passage cross-sectional area is gradually reduced toward the downstream side in the refrigerant flow. The pressurizing space 30e functions as the diffuser passage 13c.

The other configurations and operation of the ejector 13 and an ejector refrigeration cycle 10 are the same as those of the first embodiment. Therefore, the ejector 13 and the ejector refrigeration cycle 10 of the present embodiment can obtain the same advantages as those in the first embodiment.

Furthermore, according to the present embodiment, the passage formation member 35 is disposed in the pressure reducing space 30b without being disposed in the pressurizing space 30e. This makes it possible to reduce a size of the passage formation member 35 in comparison with the case where the passage formation member 35 is disposed in both of the pressure reducing space 30b and the pressurizing space 30e. As a result, the entire ejector 13 can be reduced in size and the configuration can be simplified.

In the ejector 13 of the present embodiment, although the downstream actuating bar 351b is eliminated, the upstream actuating bar 351a is integrally and coaxially coupled to the passage formation member 35. Therefore, as in the first embodiment, the center axis CL of the passage formation member 35 can be prevented from being inclined with respect to the center axes of the pressure reducing space 30b, the pressurizing space 30e, and the like.

Furthermore, in the ejector 13 according to the present embodiment, the size of the passage formation member 35 can be reduced. As a result, since a load (that is, the action of a dynamic pressure) applied to the passage formation member 35 from the refrigerant is reduced, the center axis CL of the passage formation member 35 can be further prevented from being inclined.

Further, in the ejector of the present embodiment, the passage cross-sectional area of the mixing passage 13d is reduced toward the downstream side in the refrigerant flow. Therefore, as in the first embodiment, the pressure increase performance of the diffuser passage 13c is stabilized so that the ejector efficiency can be prevented from becoming unstable, and also the mixing loss occurring when the jet refrigerant and the suction refrigerant are mixed together can be reduced.

More specifically, even if the passage formation member 35 and so on are not present, a compression wave that is reflected by a velocity boundary layer and travels toward the center axis CL side collides with a compression wave traveling from an opposite side on a center axis of the mixing passage 13d (so-called sliding surface), reflects, and turns to the outer peripheral side. Therefore, even if the passage formation member 35 is not disposed in the mixing passage 13d, the same advantages as those in the first embodiment can be obtained.

In the present embodiment, the largest outer diameter portion 30n serving as the most upstream throat portion is formed in the passage formation member 35. Therefore, the boiling nucleus can be supplied from the center axis CL side to the liquid-phase refrigerant flowing through the nozzle passage 13a. Further, the smallest passage area portion 30m serving as the downstream side throat portion is formed in the nozzle 32. Therefore, the smallest inner diameter portion 30q can also supply the boiling nucleus from the outer peripheral side to the liquid-phase refrigerant flowing through the nozzle passage 13a.

As a result, even if no gas column or the like is generated in the refrigerant in the inflow space 30a, the boiling of the refrigerant flowing through the nozzle passage 13a can be promoted, and the ejector efficiency can be improved.

Other Embodiments

The present disclosure is not limited to the above-described embodiments, but various modifications can be made thereto as follows without departing from the spirit of the present disclosure.

Figure 16:
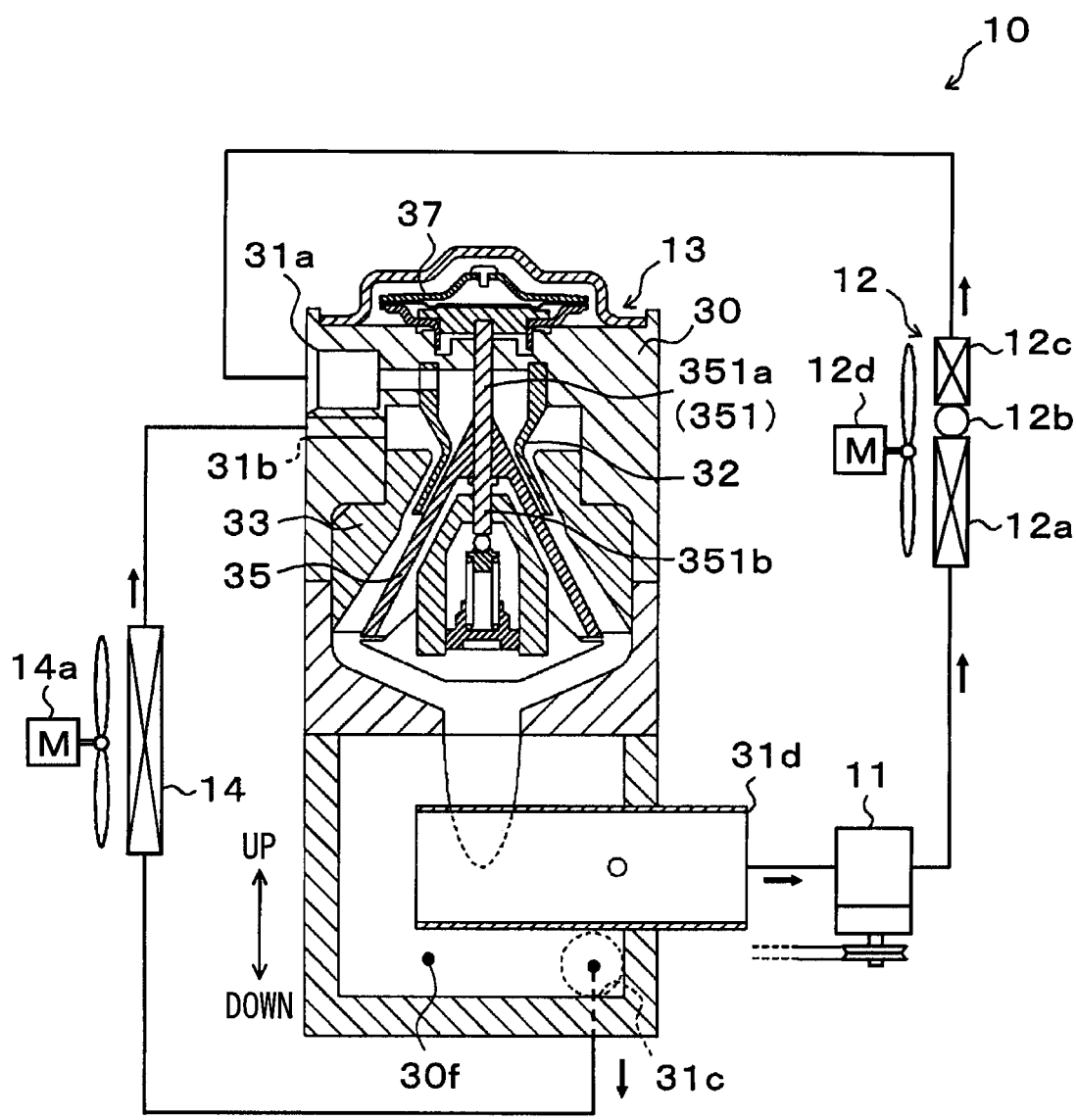
FIG. 16 is a schematic diagram of an ejector refrigeration cycle according to another embodiment.

(1) In each of the embodiments described above, the example in which the center axis CL of the passage formation member 35 of the ejector 13 is disposed in the horizontal direction has been described, but the placement of the ejector 13 is not limited to the above example. For example, as shown in the overall configuration diagram of FIG. 16, the center axis of the passage formation member 35 may be disposed in the vertical direction. In this case, it is desirable that the liquid-phase refrigerant outflow port 31c is disposed on the lowermost side of the gas-liquid separation body.

(2) The ejector 13 is not limited to that disclosed in the embodiments described above.

For example, in the embodiments described above, the example in which the upstream actuating bar 351a and the downstream actuating bar 351b are formed by the shaft 351 that is a common columnar member has been described. Alternatively, the upstream actuating bar 351a and the downstream actuating bar 351b may be formed as separate members.

Further, in the embodiments described above, one downstream actuating bar 351b is provided similarly to the upstream actuating bar 351a. Alternatively, multiple downstream actuating bars 351b may be provided. The outer diameter of the upstream actuating bar 351a and the outer diameter of the downstream actuating bar 351b may be set to the same value or may be set to different values.

In order to reduce abrasion of a bearing hole of the upper body 311 and a bearing hole of the lower body 312 in the ejector 13, a bearing member made of a cylindrical metal may be disposed in each bearing hole.

In the embodiments described above, the example in which the plate member 374 of the drive mechanism 37 is coupled to the upstream actuating bar 351a has been described. Alternatively, the drive mechanism may be coupled to the downstream actuating bar 351b.

In the embodiments described above, the drive mechanism 37 displaces the passage formation member 35 according to the temperature and pressure of the refrigerant on the outlet side of the evaporator 14, to thereby adjust the passage cross-sectional area of the nozzle passage 13a so that the degree of superheat SH of the refrigerant on the outlet side of the evaporator 14 comes closer to the reference degree of superheat KSH. However, the adjustment of the passage cross-sectional area by the drive mechanism 37 is not limited to the above example.

For example, the passage formation member 35 may be displaced according to the temperature and pressure of the refrigerant on the outlet side of the radiator 12, to thereby adjust the passage cross-sectional area of the nozzle passage 13a so that the degree of subcooling of the refrigerant on the outlet side of the radiator 12 comes closer to a predetermined reference degree of subcooling.

Further, the drive mechanism 37 is not limited to that described in the embodiments described above. For example, as a temperature sensitive medium adopted in the drive mechanism according to the first to seventh embodiments, a thermowax whose volume varies depending on the temperature may be adopted. Further, as the drive mechanism, a drive mechanism having an elastic member of a shape memory alloy property may be adopted.

Further, in the eighth embodiment, the example in which the electrically operating stepping motor 370 is adopted as the drive mechanism has been described. Needless to say, as the drive mechanism of the ejector 13 described in the eighth embodiment, the drive mechanism 37 configured by the mechanical mechanism described in the first to seventh embodiments may be employed.

(3) The respective configuration equipment configuring the ejector refrigeration cycle 10 are not limited to those disclosed in the embodiments described above.

For example, in the embodiments described above, as the compressor 11, an engine driven type variable capacity type compressor has been employed. Alternatively, as the compressor 11, a fixed capacity type compressor that adjusts the refrigerant discharge capacity while changing an operation rate of the compressor through connection and disconnection of an electromagnetic clutch can be employed. Furthermore, an electric compressor equipped with a fixed capacity type compression mechanism and an electric motor and operated by receiving an electric power may be employed. In the electric compressor, the refrigerant discharge capacity can be controlled by adjusting the rotational speed of the electric motor.

In addition, in the above-described embodiments, examples in which a subcooling heat exchanger is employed as the radiator 12 have been described, but, it is needless to say that a normal radiator formed of only the condensing portion 12a may be employed as the radiator 12. Furthermore, with a usual radiator, a receiver integrated type condenser may be adopted which is integrated with a liquid receiver (receiver) that separates a gas-liquid of a refrigerant that has been thermally radiated by a normal radiator and stores an excess liquid-phase refrigerant, together with the radiator.

In addition, in the embodiments described above, the example in which R1234y is adopted as the refrigerant has been described. However, the refrigerant is not limited to the above example. For example, R134a, R600a, R410A, R404A, R32, R407C, or the like may be adopted as the refrigerant. Alternatively, a mixture refrigerant in which plural types of those refrigerants are mixed together or the like may be adopted. Furthermore, carbon dioxide may be adopted as the refrigerant to configure a supercritical refrigeration cycle in which the high-pressure side refrigerant pressure is equal to or higher than the critical pressure of the refrigerant.

(4) In the embodiments described above, the example in which the ejector refrigeration cycle 10 according to the present disclosure is applied to the vehicle air conditioner has been described, but the application of the ejector refrigeration cycle 10 is not limited to the above configuration. For example, the ejector refrigeration cycle 10 may be applied to a stationary air conditioner, a cold storage warehouse, a vending machine for cooling heating device, and the like.

In the embodiments described above, the radiator 12 of the ejector refrigeration cycle 10 having the ejector 13 according to the present disclosure is used as a vehicle exterior heat exchanger by which heat exchange between the refrigerant and an outside air is performed, and the evaporator 14 is used as a usage side heat exchanger which cools a blown air. On the other hand, the evaporator 14 may be used as a vehicle exterior heat exchanger for absorbing a heat from a heat source such as outside air, and the radiator 12 may be used as a usage side heat exchanger for heating a heating target fluid such as air or water.

(5) In addition, the elements disclosed in the respective embodiments may be appropriately combined together in an implementable range. For example, the passage formation member 35 of the fourth embodiment may be applied to the second, third, and fifth to seventh embodiments. Further, the recess portion (through hole 35a) described in the second embodiment may be defined in the passage formation member 35 of the fifth to eighth embodiments.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. An ejector applied to a vapor-compression refrigeration cycle device, the ejector comprising: a body including an inflow space configured to allow a liquid-phase refrigerant to flow thereinto, a pressure reducing space configured to reduce a pressure of the refrigerant that has flowed out of the inflow space, a suction passage drawing a suction refrigerant from a refrigerant suction port, and a pressurizing space configured to introduce therein a jet refrigerant jetted from the pressure reducing space and the suction refrigerant drawn through the suction passage; a passage formation member at least partially disposed inside the pressure reducing space, the passage formation member and the body defining a refrigerant passage therebetween; and a diaphragm configured to displace the passage formation member, wherein the refrigerant passage includes a nozzle passage defined between an inner peripheral surface of the pressure reducing space and an outer peripheral surface of the passage formation member, the nozzle passage functioning as a nozzle which reduces the pressure of the refrigerant and jets the refrigerant, the passage formation member is coupled to an actuating bar having an upstream end that extends through the inflow space and is slidably supported by the body, a center axis of the inflow space, a center axis of the upstream end of the actuating bar, and a center axis of the passage formation member are coaxially disposed, the passage formation member is at least partially disposed inside the pressurizing space, the refrigerant passage includes a diffuser passage defined between an inner peripheral surface of the pressurizing space and the outer peripheral surface of the passage formation member, the diffuser passage functioning as a pressure increase portion which mixes and pressurizes the jet refrigerant and the suction refrigerant, a suction refrigerant outlet of the suction passage has an annular opening that surrounds an outer circumference of a refrigerant ejection port of the nozzle passage, the refrigerant passage includes a mixing passage located upstream of the diffuser passage and defined between the inner peripheral surface of the pressurizing space and the outer peripheral surface of the passage formation member, the mixing passage mixing the jet refrigerant and the suction refrigerant together, and a smallest passage cross-sectional area in the mixing passage is smaller than a total of a passage cross-sectional area of the refrigerant ejection port and a passage cross-sectional area of the suction refrigerant outlet.

2. The ejector according to claim 1, wherein
the passage formation member is coupled to a downstream end of the actuating bar that extends downstream of the diffuser passage and is slidably supported by the body.

3. The ejector according to claim 2, wherein
the center axis of the upstream end of the actuating bar and a center axis of the downstream end of the actuating bar are coaxially disposed.

4. The ejector according to claim 2, wherein
the diaphragm is coupled to the upstream end of the actuating bar.

5. The ejector according to claim 1, wherein
an outline of a wall surface, defining the mixing passage in the body on a cross-sectional plane including the center axes of the passage formation member and the diaphragm, gradually comes closer to the passage formation member in a downstream direction of the refrigerant flow.

6. The ejector according to claim 1, wherein
an outline of a wall surface, defining the mixing passage in the passage formation member on a cross-sectional plane including the center axes of the passage formation member and the diaphragm, gradually comes closer to the body in a downstream direction of the refrigerant flow.

7. The ejector according to claim 1, wherein
an outline of a wall surface, defining the nozzle passage in the passage formation member on a cross-sectional plane including the center axes of the passage formation member and the diaphragm, includes a shape sharpened toward the nozzle passage.

8. The ejector according to claim 1, wherein
the body includes a refrigerant inflow passage that introduces the refrigerant flowing from a refrigerant inflow port into the inflow space, and
the refrigerant inflow passage extends toward the center axis of the inflow space.

9. The ejector according to claim 1, wherein
the passage formation member has a recess portion recessed in a direction to increase the passage cross-sectional area of the nozzle passage.

10. The ejector according to claim 9, wherein
the recess portion is a through hole extending through a conical lateral surface of the passage formation member.

11. The ejector according to claim 9, wherein
the recess portion is a groove portion provided over an entire circumference around the center axis of the passage formation member.

12. An ejector applied to a vapor-compression refrigeration cycle device, the ejector comprising: a body including an inflow space configured to allow a liquid-phase refrigerant to flow thereinto, a pressure reducing space configured to reduce a pressure of the refrigerant that has flowed out of the inflow space, a suction passage drawing a suction refrigerant from a refrigerant suction port, and a pressurizing space configured to introduce therein a jet refrigerant jetted from the pressure reducing space and the suction refrigerant drawn through the suction passage; a passage formation member at least partially disposed inside the pressure reducing space, the passage formation member and the body defining a refrigerant passage therebetween; and a motor configured to displace the passage formation member, wherein the refrigerant passage includes a nozzle passage defined between an inner peripheral surface of the pressure reducing space and an outer peripheral surface of the passage formation member, the nozzle passage functioning as a nozzle which reduces the pressure of the refrigerant and jets the refrigerant, the passage formation member is coupled to an actuating bar having an upstream end that extends through the inflow space and is slidably supported by the body, a center axis of the inflow space, a center axis of the upstream end of the actuating bar, and a center axis of the passage formation member are coaxially disposed, the passage formation member is at least partially disposed inside the pressurizing space, the refrigerant passage includes a diffuser passage defined between an inner peripheral surface of the pressurizing space and the outer peripheral surface of the passage formation member, the diffuser passage functioning as a pressure increase portion which mixes and pressurizes the jet refrigerant and the suction refrigerant, a suction refrigerant outlet of the suction passage has an annular opening that surrounds an outer circumference of a refrigerant ejection port of the nozzle passage, the refrigerant passage includes a mixing passage located upstream of the diffuser passage and defined between the inner peripheral surface of the pressurizing space and the outer peripheral surface of the passage formation member, the mixing passage mixing the jet refrigerant and the suction refrigerant together, and a smallest passage cross-sectional area in the mixing passage is smaller than a total of a passage cross-sectional area of the refrigerant ejection port and a passage cross-sectional area of the suction refrigerant outlet.

* * * * *